US009280032B2

(12) United States Patent
Fujisawa

(10) Patent No.: US 9,280,032 B2
(45) Date of Patent: Mar. 8, 2016

(54) METHOD AND DEVICE FOR CONVERTING OPTICAL FREQUENCY

(75) Inventor: Shinsuke Fujisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 14/114,003

(22) PCT Filed: Apr. 23, 2012

(86) PCT No.: PCT/JP2012/002769
§ 371 (c)(1),
(2), (4) Date: Oct. 25, 2013

(87) PCT Pub. No.: WO2012/147324
PCT Pub. Date: Nov. 1, 2012

(65) Prior Publication Data
US 2014/0043673 A1 Feb. 13, 2014

(30) Foreign Application Priority Data

Apr. 28, 2011 (JP) .................................. 2011-100427

(51) Int. Cl.
*G02F 2/02* (2006.01)
*H04B 10/25* (2013.01)
(Continued)

(52) U.S. Cl.
CPC ...... *G02F 2/02* (2013.01); *H04B 10/25* (2013.01); *H04B 10/29* (2013.01); *G02F 2001/212* (2013.01); *G02F 2002/006* (2013.01); *G02F 2203/50* (2013.01); *G02F 2203/58* (2013.01)

(58) Field of Classification Search
CPC ........................................................ G02F 2/02
See application file for complete search history.

(56) References Cited

U.S. PATENT DOCUMENTS 6,211,996 B1 * 4/2001 Fuse ............................. 359/278
7,518,459 B2 * 4/2009 Cheng et al. .................. 332/103
(Continued)

FOREIGN PATENT DOCUMENTS

| JP | 2004-85602 A | 3/2004 |
|----|--------------|--------|
| JP | 2005-265959 A | 9/2005 |
| WO | 2006/080168 A1 | 8/2006 |

OTHER PUBLICATIONS

International Search Report for PCT Application No. PCT/JP2012/002769, mailed on Jul. 17, 2012.
(Continued)

*Primary Examiner* — Daniel Petkovsek

(57) ABSTRACT

An optical frequency conversion method and device are provided by which a component other than a desired harmonic component can be eliminated with high precision and an output lightwave with the desired frequency component can be easily extracted even if the frequency of a modulation signal is changed. A plurality of phase control sections (101-1 to 101-n) that respectively generate a plurality of individual modulation signals with different phases from a modulation signal, a plurality of optical single sideband modulation sections (MOD1 to MODn) that respectively modulate an input lightwave in accordance with the plurality of individual modulation signals, and a plurality of optical phase control sections (201-1 to 201-n) that respectively give optical phase differences to a plurality of lightwaves that are respectively output from the plurality of optical single sideband modulation sections, an output lightwave is generated by multiplexing a plurality of lightwaves that are output from the plurality of optical phase control sections, wherein phase differences among the plurality of individual modulation signals and the optical phase differences are set so that a predetermined harmonic component other than a target frequency in the output lightwave will be eliminated.

7 Claims, 14 Drawing Sheets

(51) Int. Cl.
*H04B 10/29* (2013.01)
*G02F 1/21* (2006.01)
*G02F 2/00* (2006.01)

(56) References Cited

U.S. PATENT DOCUMENTS 7,957,653 B2 * 6/2011 Kawanishi et al. ........... 398/188
8,000,612 B2 * 8/2011 Ohira et al. ................... 398/188
8,867,927 B2 * 10/2014 Akiyama et al. .............. 398/188

OTHER PUBLICATIONS

Kaoru Higuma et al., "The Development of X-cut LiNbO3 Optical Frequency Shifter/ SSB-SC Modulator", The Technical Report of IEICE, OPE 2001-159, The Institute of Electronics, Information and Communication Engineers, Feb. 2002, pp. 59-64.

* cited by examiner

FIG.2A (RELATED ART)
FREQUENCY COMPONENTS
IN INPUT LIGHTWAVE

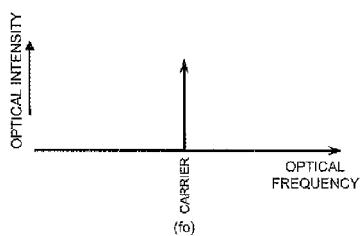

FIG.2B (RELATED ART)
FREQUENCY COMPONENTS
IN OUTPUT LIGHTWAVE OF
RESONANCE-TYPE OPTICAL
INTENSITY MODULATOR
fo+(2n-1)f, [fo+(2n-1)f]

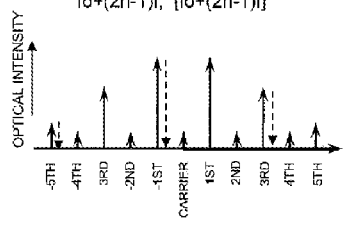

FIG.2C (RELATED ART)
FREQUENCY COMPONENTS
IN OUTPUT LIGHTWAVE OF
OPTICAL FREQUENCY SHIFTER
fo+(4n+1)f

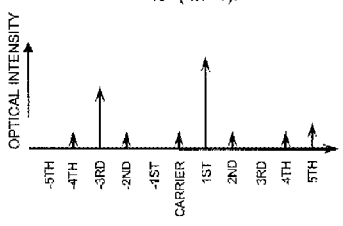

FIG.2D (RELATED ART)
FREQUENCY COMPONENTS
EXTRACTED FROM OUTPUT
LIGHTWAVE BY FILTER

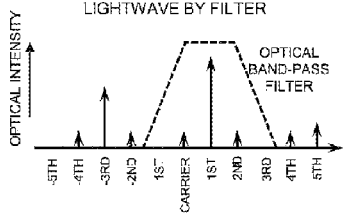

FIG.2E (RELATED ART)
FREQUENCY COMPONENTS
IN OUTPUT LIGHTWAVE OF
LOW-NOISE OPTICAL FREQUENCY
CONVERSION DEVICE

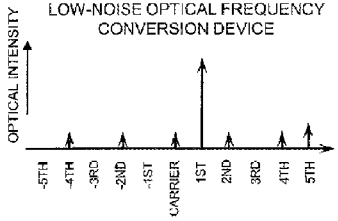

IN CASE WHERE INPUT
LIGHTWAVE IS DATA SIGNAL

FREQUENCY COMPONENTS
IN OUTPUT LIGHTWAVE OF
OPTICAL FREQUENCY SHIFTER (EXEMPLARY EMBODIMENT)

(FIRST EXAMPLE)

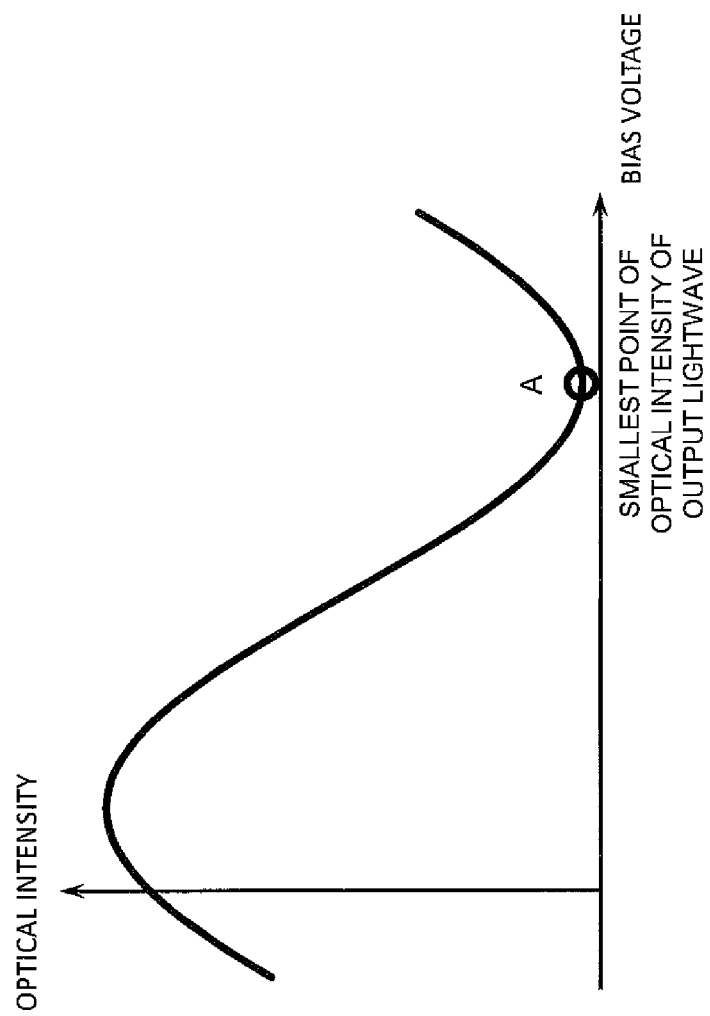

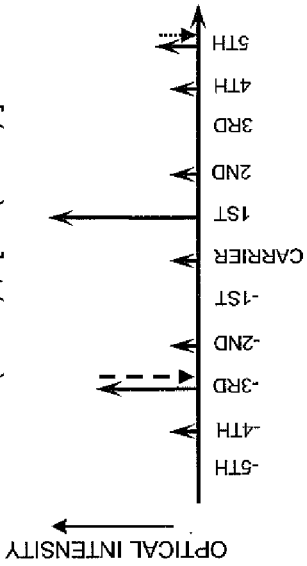

FIG. 7A
FREQUENCY COMPONENTS IN INPUT LIGHTWAVE

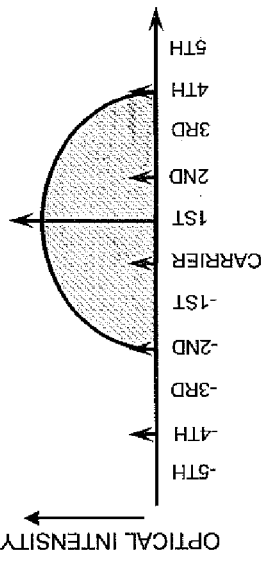

FIG. 7B
FREQUENCY COMPONENTS IN OUTPUT LIGHTWAVE OF RESONANCE-TYPE OPTICAL INTENSITY MODULATOR
$f_0+(4n+1)f$, $[f_0+(4n+1)f]$

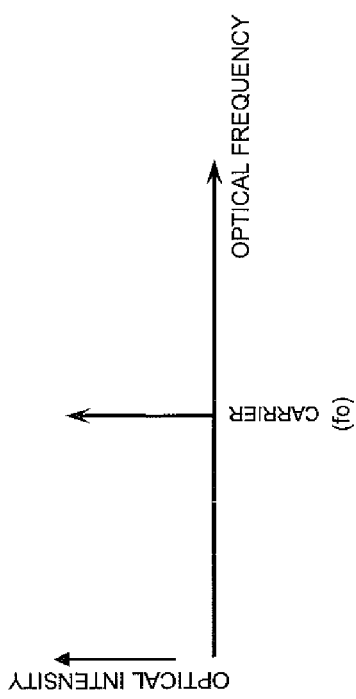

FIG. 7C
FREQUENCY COMPONENTS IN OUTPUT LIGHTWAVE OF OPTICAL FREQUENCY CONVERSION DEVICE ACCORDING TO THE PRESENT EXAMPLE

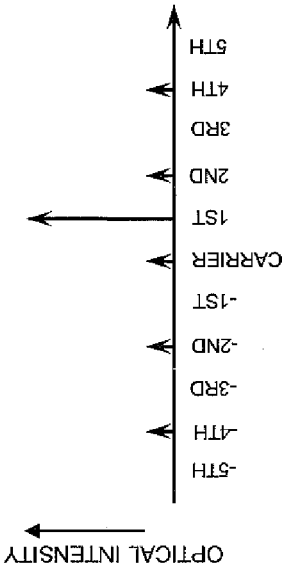

FIG. 7D
FREQUENCY COMPONENTS IN OUTPUT DATA SIGNAL OF OPTICAL FREQUENCY CONVERSION DEVICE ACCORDING TO THE PRESENT EXAMPLE (SECOND EXAMPLE)

(THIRD EXAMPLE)

(FOURTH EXAMPLE)

FIG. 12
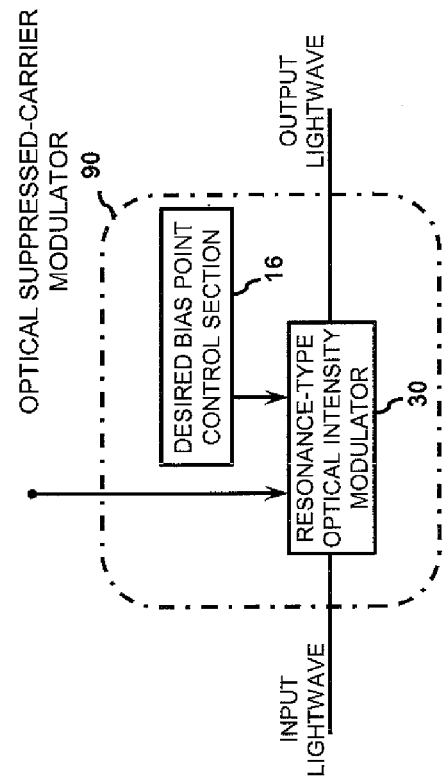
FIG. 12A
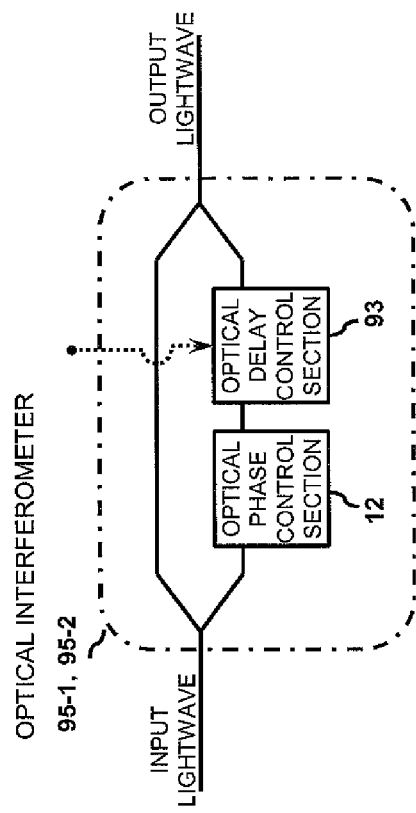
FIG. 12B (FIFTH EXAMPLE)

(SIXTH EXAMPLE)

METHOD AND DEVICE FOR CONVERTING OPTICAL FREQUENCY

This application is a National Stage Entry of PCT/JP2012/002769 filed Apr. 23, 2012, which claims priority from Japanese Patent Application 2011-100427 filed Apr. 28, 2011, the contents of all of which are incorporated herein by reference, in their entirety.

TECHNICAL FIELD

The present invention relates to an optical frequency conversion method and device for generating an output lightwave with a desired frequency component from an input lightwave.

BACKGROUND ART

Conventionally, in the optical communication field and optical measurement field, devices have been studied that convert optical frequency by an arbitrary shift amount with high precision and at high speed. For WDM cross-connects in the optical communication field in particular, there are demands for optical frequency conversion devices with which a desired optical frequency component can be stably obtained, with which a shift amount of optical frequency can be fine-tuned, and with which little loss of optical intensity is incurred. For methods of converting the frequency of an input lightwave, a generally known method is that the frequency of an input lightwave is shifted by using an optical single sideband modulator (for example, NPL 1). Hereinafter, an optical frequency shifter disclosed in NPL 1 will be described briefly.

Referring to FIG. 1A, an optical single sideband modulator 10 includes two resonant type intensity modulators 30-1 and 30-2 that are provided to the arms of a main Mach-Zehnder (MZ) waveguide, respectively, and an optical phase shifter 32 that is connected to the resonant type intensity modulator 30-2 in series, wherein the resonant type intensity modulators themselves are made up of the MZ waveguide. A modulation signal is input to each of an input terminal $RF_A$ of the resonant type intensity modulator 30-1 and an input terminal $RF_B$ of the resonant type intensity modulator 30-2, and bias voltage for control is input to each of input terminals $Bias_A$ and $Bias_B$ thereof. A control signal for phase adjustment is input to an input terminal Phase of the optical phase shifter 32.

Referring to FIG. 1B, an optical frequency shifter 38 includes the above-described optical single sideband modulator 10, a modulation signal oscillator 11, an optical phase shift amount adjustment section 13, and a phase control section 14. The modulation signal oscillator 11 generates a modulation signal, and the modulation signal is directly input to the terminal $RF_A$ of the optical single sideband modulator 10 while it is input to the terminal $RF_B$ thereof through the phase control section 14. The modulation signal is assumed to be a sine wave of a single frequency f. The phase control section 14 is controlled so as to give a phase difference of $-\pi/2$ between the modulation signals to be respectively input to the terminals $RF_A$ and $RF_B$ of the optical single sideband modulator 10. Moreover, the optical phase shift amount adjustment section 13 controls the optical phase shifter 32 so as to give a phase difference of $\pi/2$ between an output lightwave of the resonant type optical intensity modulator 30-1 and an output lightwave of the resonant type optical intensity modulator 30-2.

It is assumed that continuous-wave laser light of a carrier frequency $f_0$ that has a frequency spectrum as shown in FIG. 2A is input to the optical frequency shifter 38 having such a configuration. At this time, an output lightwave of the resonant type optical intensity modulator 30-1 of the optical single sideband modulator 10 has a frequency spectrum including frequency components of $f_0+(2n-1)f$ (n is an integer) in which the harmonics of the carrier wave and of even orders are suppressed as shown in FIG. 2B.

On the other hand, an output lightwave of the optical phase shifter 32, which has shifted an output of the resonant type optical intensity modulator 30-2 by $\pi/2$, similarly includes the frequency components of $f_0+(2n-1)f$ as shown in FIG. 2B, but of them, the phases of frequency components of $f_0+(4n-1)f$ are inverted by $\pi$. Hereinafter, if the phases of certain components are inverted in a regular manner even though a frequency spectrum is the same as another one as descried above, the formula of such frequency components will be represented by being enclosed by [ ]. Here, the frequency components of the output lightwave of the optical phase shifter 32 are represented by $[f_0+(2n-1)f]$ because only the phases of the frequency components of $f_0+(4n-1)f$ are inverted by $\pi$ with respect to the frequency components of $f_0+(2n-1)f$ of the output lightwave of the resonant type optical intensity modulator 30-1.

When such output lightwaves of the resonant type optical intensity modulator 30-1 and of the optical phase shifter 32 are multiplexed, the frequency components whose phases are mutually inverted by $\pi$ are canceled out, and a frequency spectrum including frequency components of $f_0+(4n+1)f$ as shown in FIG. 2C is obtained as an output lightwave of the optical frequency shifter 38. Accordingly, by using an optical band-pass filter having a characteristic as indicated by a dashed line in FIG. 2D, an output lightwave can be obtained in which the carrier wave frequency $f_0$ is shifted to a frequency component of $(f_0+f)$ as shown in FIG. 2D.

According to the optical frequency shifter 38 as described above, the $-3^{rd}$ frequency component has high optical intensity as can be seen from FIG. 2C, and an optical band-pass filter is required to eliminate the $-3^{rd}$ frequency component. However, PTL 1 proposes an optical frequency conversion device that does not require such an optical band-pass filter.

A low-noise optical frequency conversion device disclosed in PTL 1 is provided with a driving system which includes a phase-locked tripler that triples the frequency of a fundamental wave, an amplitude adjustor that adjusts the amplitudes of the fundamental wave and the triple wave, and a 90-degree hybrid, thereby suppressing a third-order harmonic component among harmonics as shown in FIG. 2C. More specifically, this driving system applies a multiplexed wave of the fundamental wave and its triple wave to the terminal $RF_A$ of the optical single sideband modulator 10 shown in FIG. 1A and applies a multiplexed wave having a phase difference of $-\pi/2$ from that multiplexed wave to the terminal $RF_B$. Then, the amplitudes and phases of these two multiplexed waves are appropriately selected, whereby the third harmonic is suppressed as shown in FIG. 2E.

CITATION LIST

Patent Literature

[PTL 1] Japanese Patent Application Unexamined Publication No. 2004-85602

Non Patent Literature

[NPL 1] Kaoru Higuma, Yoshihiro Hashimoto, Satoshi Oikawa, Tetsuya Kawanishi, and Masayuki Izutsu, "The Development of X-cut LiNbO3 Optical Frequency Shifter/SSB-SC Modulator," the Technical Report of IEICE OPE2001-159, The Institute of Electronics, Information and Communication Engineers

SUMMARY OF INVENTION

Technical Problem

However, according to the method in which a desired frequency component is selectively obtained by using an optical band-pass filter as shown in FIG. 2D, an optical band-pass filter having a steep cutoff characteristic is required. Not only it is very difficult to produce such a band-pass filter with high precision, but it is also necessary to control temperature with high precision in order to maintain the center frequency characteristic of the optical band-pass filter. Moreover, in a case of a modulation frequency of several GHz, the problem arises that a control circuit is complicated because the optical band-pass filter needs to have the rising characteristic of a passband within the range of several GHz.

Furthermore, if an optical signal modulated based on data as shown in FIG. 3A is input to the optical frequency shifter 38, an output lightwave of the optical frequency shifter 38 has a first-order frequency component frequency-shifted overlapping with harmonic components, as shown in FIG. 3B. Such degradation of a data signal cannot be eliminated even by using an optical band-pass filter. In optical frequency conversion in particular, since a target optical frequency dynamically changes depending on a modulation signal, it is necessary to dynamically adjust the characteristics of an optical band-pass filter depending on a change in the frequency of a modulation signal. However, it is difficult to dynamically control the characteristics of an optical band-pass filter and also to maintain a steep cutoff characteristic.

On the other hand, the low-noise optical frequency conversion device disclosed in PTL 1 can suppress a third harmonic without using an optical band-pass filter. However, when the frequency of the fundamental wave, which is a modulation signal, changes, it is difficult to adjust amplitude in step with the amount of the change. That is, although it is necessary to adjust the amplitude of the triple wave in step with the amount of the change at the same time, waveform distortion occurs as the frequency becomes higher because the amplitude of a triple wave is not linear with respect to a change in frequency. Therefore, the higher the frequency of a modulation signal is, the more difficult it is to realize an optical frequency conversion device by using this method.

Accordingly, the present invention is made in consideration of the problems as described above, and an object thereof is to provide an optical frequency conversion method and device that can eliminate components other than a desired harmonic component with high precision and can easily extract an output lightwave with a desired frequency component even if the frequency of a modulation signal is changed.

Solution to Problem

An optical frequency conversion device according to the present invention is an optical frequency conversion device which converts a frequency of an input lightwave in accordance with a modulation signal by using an optical single sideband modulation scheme and thereby generates an output lightwave, characterized by comprising: a plurality of phase control means for respectively generating from the modulation signal; a plurality of individual modulation signals with different phases; a plurality of optical single sideband modulation means for respectively modulating the input lightwave in accordance with the plurality of individual modulation signals; a plurality of optical phase control means for respectively giving optical phase differences to a plurality of lightwaves that are respectively output from the plurality of optical single sideband modulation means; and multiplexing means for multiplexing a plurality of lightwaves that are output from the plurality of optical phase control means to generate the output lightwave, wherein phase differences among the plurality of individual modulation signals and the optical phase differences are set so that a predetermined harmonic component other than a target frequency in the output lightwave will be eliminated.

An optical frequency conversion method according to the present invention is an optical frequency conversion method in which a frequency of an input lightwave is converted in accordance with a modulation signal by using an optical single sideband modulation scheme and an output lightwave is thereby generated, characterized by: a plurality of phase control means respectively generating from the modulation signal a plurality of individual modulation signals with different phases; a plurality of optical single sideband modulation means respectively modulating the input lightwave in accordance with the plurality of individual modulation signals; a plurality of optical phase control means respectively giving optical phase differences to a plurality of optical lightwaves that are respectively output from the plurality of optical single sideband modulation means; and multiplexing means multiplexing a plurality of lightwaves that are output from the plurality of optical phase control means to generate the output lightwave, wherein phase differences among the plurality of individual modulation signals and the optical phase differences are set so that a predetermined harmonic component other than a target frequency in the output lightwave will be eliminated.

Advantageous Effects of Invention

According to the present invention, it is possible to eliminate components other than a desired harmonic component with high precision and to easily extract an output lightwave with a desired frequency component even if the frequency of a modulation signal is changed.

BRIEF DESCRIPTION OF DRAWINGS

FIG. 2A is a frequency spectrum diagram showing frequency components of an input lightwave, FIG. 2B is a frequency spectrum diagram showing frequency components of an output lightwave of a resonant type optical intensity modulator, FIG. 2C is a frequency spectrum diagram showing frequency components of an output lightwave of a optical frequency shifter, FIG. 2D is a frequency spectrum diagram showing frequency components extracted by a filter from an output lightwave, and FIG. 2E is a frequency spectrum diagram showing frequency components of an output lightwave of a low-noise optical frequency conversion device.

FIG. 6 is a graph showing a relation between the bias points of a resonant type optical intensity modulator used in the present example and the optical intensity of an output lightwave.

FIG. 7A is a frequency spectrum diagram showing frequency components of an input lightwave, FIG. 7B is a frequency spectrum diagram showing frequency components of an output lightwave of a resonant type optical intensity modulator, FIG. 7C is a frequency spectrum diagram showing frequency components of an output lightwave of the optical frequency conversion device according to the present example, and FIG. 7D is a frequency spectrum diagram showing frequency components of an output lightwave of the optical frequency conversion device according to the present example when an input lightwave is a data signal.

FIG. 12A is a block diagram showing a functional configuration of an optical suppressed-carrier modulator shown in FIG. 11, and FIG. 12B is a block diagram showing a functional configuration of an optical interferometer shown in FIG. 11.

DESCRIPTION OF EMBODIMENTS

Figure 1A:
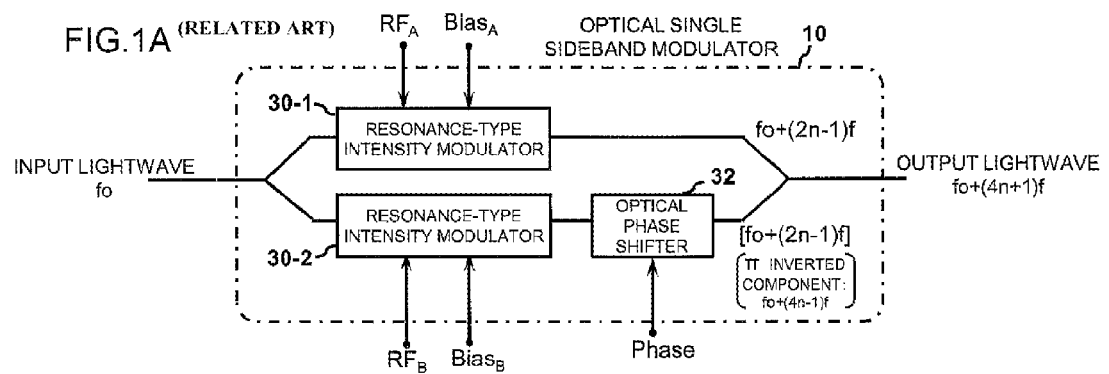
FIG. 1A is a block diagram showing a configuration of a general optical single sideband modulator.
Figure 1B:
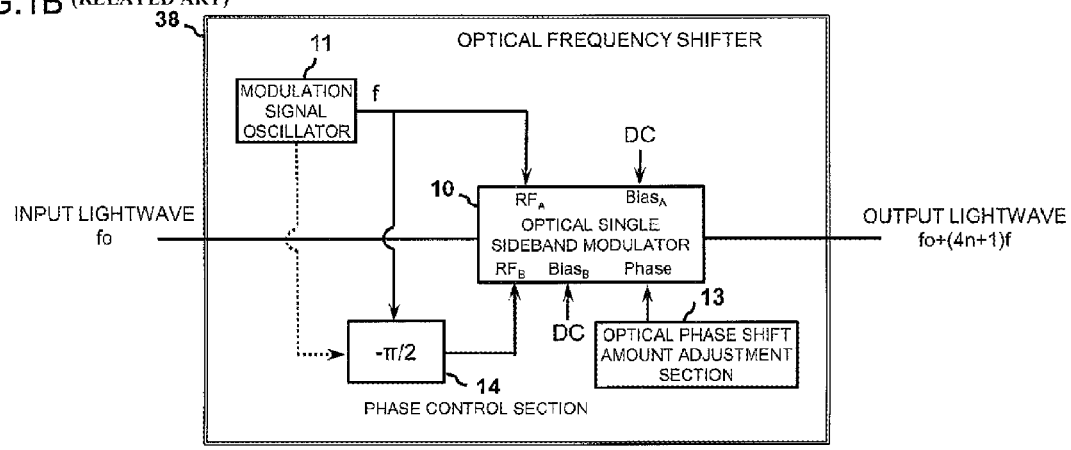
FIG. 1B is a block diagram showing an example of a basic configuration of an optical frequency shifter using the same.
Figure 3A:
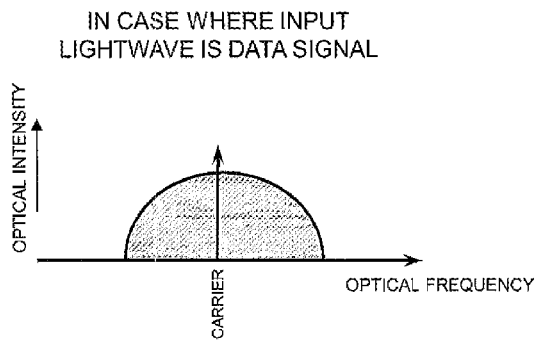
FIG. 3A is a frequency spectrum diagram when an input lightwave is a data signal.
Figure 3B:
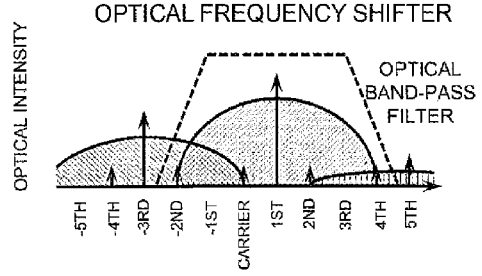
FIG. 3B is a frequency spectrum diagram showing frequency components of an output lightwave of an optical frequency shifter.
Figure 4:
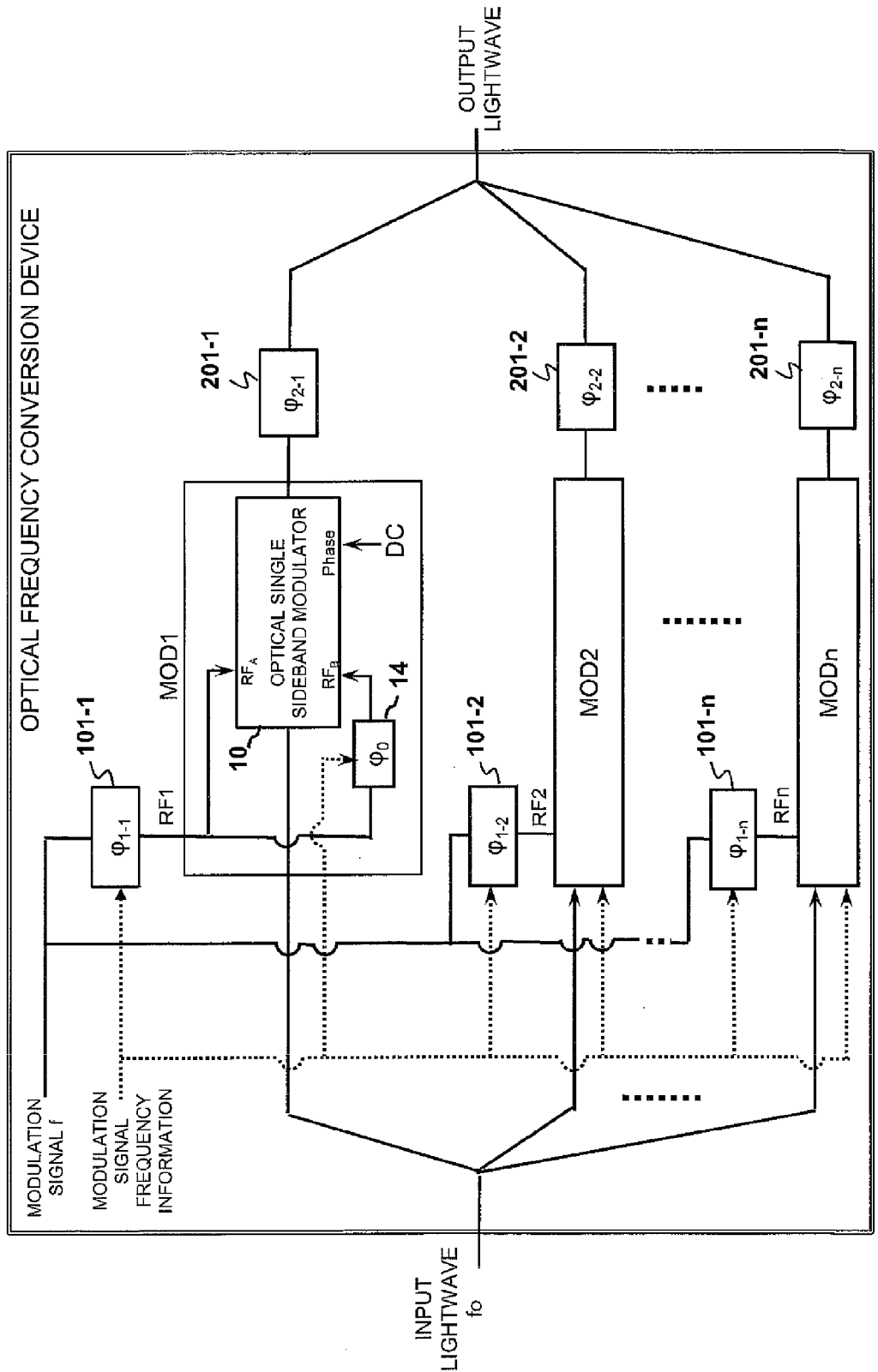
FIG. 4 is a block diagram showing a generalized configuration of an optical frequency conversion device according to an exemplary embodiment of the present invention.

Referring to FIG. 4, an optical frequency conversion device according to an exemplary embodiment of the present invention includes a plurality (a number n) of optical modulation sections MOD1 to MODn, as well as n phase control sections 101-1 to 101-n and n optical phase control sections 201-1 to 201-n which are connected to the optical modulation sections MOD1 to MODn, respectively, wherein each optical modulation section includes an optical single sideband modulator 10 and a phase control section 14 as shown in FIG. 1. Terminals RF1 to RFn of the optical modulation sections MOD1 to MODn are directly connected to terminals $RF_A$ of their respective corresponding optical single sideband modulators 10 and are also connected to terminals $RF_B$ thereof through the phase control sections 14. The phase control section 14 is controlled so as to give a phase difference $\phi_0$ (here, $\phi_0=\pi/2$) between individual modulation signals respectively input to the terminals $RF_A$ and $RF_B$.

A modulation signal of a frequency f is an electric signal, and the phase control section 101-1 gives a phase difference $\phi_{1-1}$ to this modulation signal to generate an individual modulation signal, which is then input to the terminal RF1 of the optical modulation section MOD1. Similarly, the phase control section 101-2 gives a phase difference $\phi_{1-2}$ to the modulation signal to generate an individual modulation signal, which is then input to the terminal RF2 of the optical modulation section MOD2. Thereafter, individual modulation signals are similarly input to the terminals RF3 to RFn of the optical modulation sections MOD3 to MODn through the phase control sections 101-3 to 101-n that give phase differences $\phi_{1-3}$ to $\phi_{1-n}$ to the modulation signal, respectively.

The phase control section 14 of each optical modulation section MOD and the phase control sections 101-1 to 101-n change their phase control operation points depending on the frequency f of a modulation signal from a modulation signal oscillator 11. An input lightwave with a frequency component $f_0$ is input to the optical single sideband modulator 10 of each of the optical modulation sections MOD1 to MODn, and optical outputs of the individual optical single sideband modulations 10 are multiplexed after passing through the phase control sections 201-1 to 201-n that give phase differences $\phi_{2-1}$ to $\phi_{2-n}$, respectively, whereby an output lightwave is generated from which a desired harmonic component is eliminated, which will be described later.

According to the present exemplary embodiment, the phase control sections 101-1 to 101-n and the optical phase control sections 201-1 to 201-n are separately phase-controlled, whereby the phase of a desired harmonic component can be inverted by $\pi$. Such lightwaves with the inverted harmonic component and lightwaves without the inverted harmonic component are multiplexed, whereby the desired harmonic component can be eliminated. Assuming that a harmonic component to be eliminated is $f_0+(2m+1)f$, then n is the smallest integer that is not smaller than $\log_2(m)$. At this time, the phase control section 101-(k+1) is set for $\pi/2^{K+1}$ (k=1, ..., n−1) with the phase control section 101-1 as a base, and the optical phase control section 201-(k+1) is set for $-\pi/2^{K+1}$ with the optical phase control section 201-1 as a base. However, if n is not larger than 1, it is possible to eliminate a desired harmonic only by using the optical single sideband modulation devices 10.

For example, if a harmonic to be eliminated is a fifth-order one, then 2 m+1=5, and so n=$\log_2(2)$=1. When the phase control section 101-1 and the optical phase control section 201-1 that are connected to the optical modulation section MOD1 are set so that the phase $\phi_{1-1}$=0 and the phase $\phi_{2-1}$=0, respectively, then the phase control section 101-2 and the optical phase control section 201-2 that are connected to the optical modulation section MOD2 are set so that the phase $\phi_{1-2}$=$\pi/4$ and the phase $\phi_{2-2}$=$-\pi/4$, respectively. Since a desired harmonic can be eliminated in a similar manner, an output lightwave with a target frequency component can be obtained only by phase control.

As described above, according to the present exemplary embodiment, two or more optical single sideband modulators 10 are disposed in parallel; phases between modulation signals to drive these optical single sideband modulators 10 are electrically controlled by the phase control sections; and phase differences between output lightwaves of the optical single sideband modulators 10 are optically controlled by the optical phase control sections, whereby it is possible to give a phase difference of $\pi$ to a harmonic component to be eliminated in frequency spectra included in the output lightwaves of the optical single sideband modulators 10. Accordingly, by multiplexing these output lightwaves, frequency components whose phases differ from each other by $\pi$ can be eliminated at once due to interference, whereby it is possible to improve the precision of frequency conversion to a desired level of precision.

Further, according to the present exemplary embodiment, only phase differences are set among the phase control sections 101-1 to 101-n and among the optical phase control sections 201-1 to 201-n. Therefore, a desired harmonic component can be easily eliminated with high precision by simple control, without using an optical band-pass filter. Moreover, since an unnecessary harmonic can be eliminated, even if an input lightwave is a data signal, it is possible to prevent degradation of an output data signal caused by a target frequency component and the harmonic component overlapping.

Note that the optical frequency conversion device according to the present exemplary embodiment can be applied not only to optical frequency conversion but also to an optical modulation circuit of an optical transmitter. In such a case, an input lightwave is an optical carrier or an optical transmission signal, and a modulation single is en electric signal that carries information to be sent. Hereinafter, examples of the present invention will be described in detail.

2. First Example

An optical frequency conversion device according to a first example of the present invention is configured by using two optical single sideband modulators. Here, to avoid complicating description, description will be given of a case as an example where an input lightwave with a carrier frequency $f_0$ is converted to an output lightwave with an optical frequency $f_0+f$ by using a modulation signal with a frequency f, and further third and fifth harmonics included in the output lightwave, that is, a frequency component of an optical frequency $(f_0-3f)$ and a frequency component of an optical frequency $(f_0+5f)$ are eliminated at once.

2.1) Configuration

Figure 5:
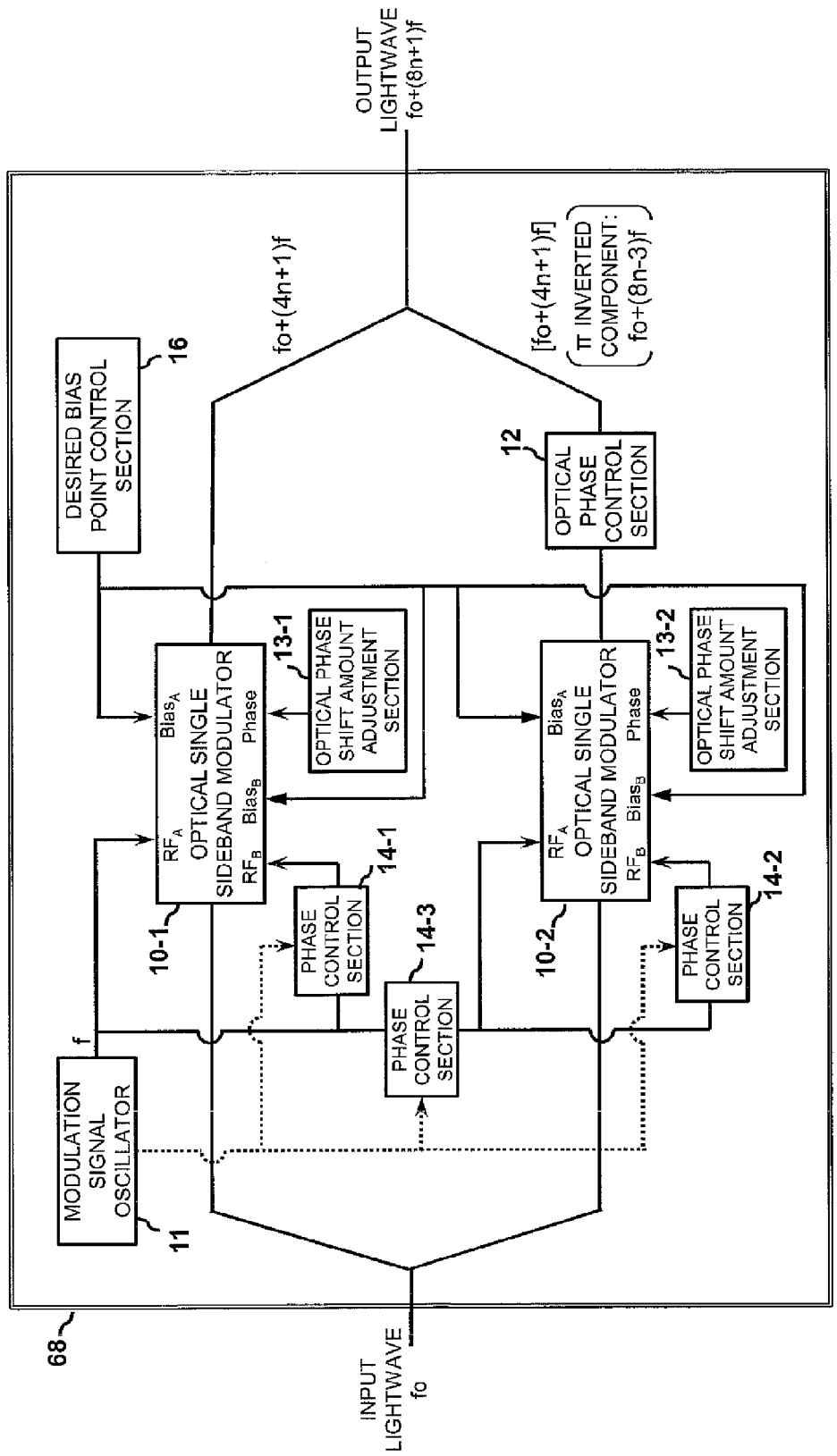
FIG. 5 is a block diagram showing a functional configuration of an optical frequency conversion device according to a first example of the present invention.

Referring to FIG. 5, an optical frequency conversion device 68 according to the present example includes two optical single sideband modulators 10-1 and 10-2, a modulation signal oscillator 11, an optical phase control section 12, two optical phase shift amount control sections 13-1 and 13-2, phase control sections 14-1 and 14-2 for giving a phase difference between terminals $RF_A$ and $RF_B$, a phase control section 14-3 for giving a modulation signal phase difference between the optical single sideband modulators, and a desired bias point control section 16.

The optical single sideband modulator 10-1 modulates an input lightwave by using a modulation signal generated by the modulation signal oscillator 11 as an individual modulation signal, while the optical single sideband modulator 10-2 modulates the input lightwave based on an individual modulation signal that is obtained from the modulation signal whose phase has been controlled by the phase control section 14-3. Each of the optical single sideband modulators 10-1 and 10-2 has resonant type optical intensity modulators 30-1 and 30-2 as shown in FIG. 1A. The modulation signal oscillator 11 electrically generates a modulation signal from which individual modulation signals for driving the optical single sideband modulators 10-1 and 10-2 are generated. The modulation signal is a sine wave of a single frequency, and the frequency thereof is assumed to be f.

The phase control section 14-1 performs control so that a phase difference between modulation signals input to the terminals $RF_A$ and $RF_B$ of the optical single sideband modulator 10-1 will be $-\pi/2$, and the phase control section 14-2 also similarly performs control so that a phase difference between modulation signals input to the terminals $RF_A$ and $RF_B$ of the optical single sideband modulator 10-2 will be $-\pi/2$. Moreover, the phase control section 14-3 performs control so that an individual modulation signal input to the terminal $RF_A$ of the optical single sideband modulator 10-2 will have a phase difference of $\pi/4$ with reference to an individual modulation signal input to the terminal $RF_A$ of the optical single sideband modulator 10-1. Additionally, the phase control sections 14-1, 14-2, and 14-3 change their phase control operation points depending on the frequency f of a modulation signal generated by the modulation signal oscillator 11.

The optical phase control section 12 performs control so that a phase difference between output lightwaves of the two optical single sideband modulators 10-1 and 10-2 will be $\pi/4$. The two optical phase shift amount control sections 13-1 and 13-2 control terminals Phase of the optical single sideband modulators 10-1 and 10-2 so that a phase difference between output lightwaves of the resonant type optical intensity modulators 30-1 and 30-2 included in each of the two optical single sideband modulators 10-1 and 10-2 will be $\pi/2$.

The desired bias point control section 16 controls the bias points of the resonant type optical intensity modulators 30-1 and 30-2 so that the optical intensity of an output lightwave of the optical single sideband modulator 10 will be the smallest (point A) when no modulation signal is input, as shown in FIG. 6.

2.2) Operation

In the optical frequency conversion device 68 having a configuration as described above, it is assumed that continuous-wave laser light of the carrier frequency $f_0$ having a frequency spectrum as shown in FIG. 7A is input. At this time, the frequency spectrum of an output lightwave of the optical single sideband modulator 10-1 includes frequency components of $f_0+(4n+1)f$ (n is an integer) as shown in FIG. 7B.

On the other hand, the frequency spectrum of an output lightwave of the optical single sideband modulator 10-2 that has passed through the optical phase shift control section 12 includes the frequency components of $f_0+(4n+1)f$ similarly to the frequency spectrum in FIG. 7B, but the phases of frequency components of $f_0+(8n-3)f$ are inverted by $\pi$. According to the way of expression described already, the lightwave having passed through the optical phase shift control section 12 is expressed as $[f_0+(4n+1)f]$.

When the output lightwave of the optical single sideband modulator 10-1 and the output lightwave of the optical single sideband modulator 10-2 that has passed through the optical phase shift control section 12 as described above are multiplexed, frequency components whose phases are mutually inverted by $\pi$ are cancelled out, so that a frequency spectrum including frequency components of $f_0+(8n+1)f$ as shown in FIG. 7C is obtained as an output lightwave of the optical frequency conversion device 68. That is, an output lightwave in which the carrier frequency $f_0$ is shifted to a frequency component of $(f_0+f)$ can be obtained.

2.3) Effects

As described above, the optical frequency conversion device 68 uses the two optical single sideband modulators 10-1 and 10-2, whereby it is possible to shift the frequency $f_0$ of an input lightwave by an arbitrary shift amount, without using an optical band-pass filter. In addition, even if an input lightwave is a data signal, degradation of an output data signal due to its overlapping with another harmonic component does not occur, as shown in FIG. 7D.

Note that when an input lightwave with the carrier frequency $f_0$ is converted to an output lightwave with an optical frequency $f_0-f$, and further frequency components of optical frequencies $(f_0+3f)$ and $(f_0-5f)$ included in the output lightwave are eliminated at once, it can be achieved by performing control so that, for example, the phase control section 14-1 will give a phase difference of $\pi/2$, the phase control section 14-2 will give a phase difference of $\pi/2$, and the phase control section 14-3 will give a phase difference of $\pi/4$, with reference to an individual modulation signal to be input to the terminal $RF_A$ of the optical single sideband modulator 10-1. As described above, the phase of an optical signal is controlled by using the optical phase control section 12 and the optical phase shift amount control sections 13-1 and 13-2, or the phase of a modulation signal is controlled by using the phase control sections 14-1, 14-2, and 14-3, whereby it is also possible to eliminate another frequency component.

Note that, for degrees of freedom in phase, the optical frequency conversion device 68 according to the present example can also be implemented even in a case where control is performed so that a phase of an integral multiple of $2\pi$ is added to the phase differences controlled by the optical phase control section and the phase control sections.

3. Second Example

An optical frequency conversion device according to a second example of the present invention is configured by using four resonant type optical intensity modulators. Here, to avoid complicating description, description will be given of a case as an example where an input lightwave with a carrier frequency $f_0$ is converted to an output lightwave with an optical frequency $f_0+f$ by using a modulation signal with a frequency f, and further third- and fifth-order harmonics included in the output lightwave, that is, a frequency component of an optical frequency ($f_0-3f$) and a frequency component of an optical frequency ($f_0+5f$) are eliminated at once.

3.1) Configuration

Figure 8:
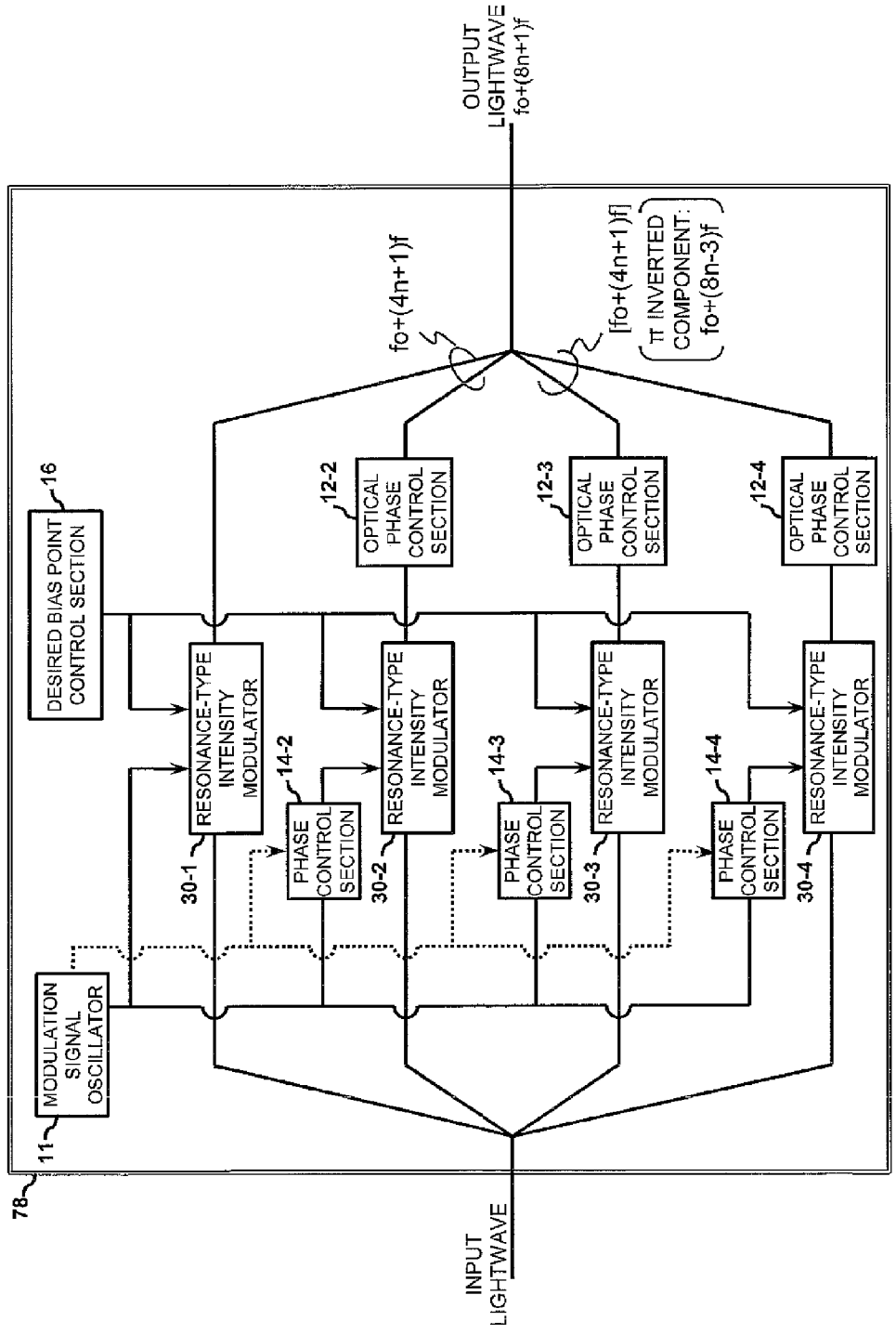
FIG. 8 is a block diagram showing a functional configuration of an optical frequency conversion device according to a second example of the present invention.

Referring to FIG. 8, in an optical frequency conversion device 78 according to the present example, the optical single sideband modulators 10-1 and 10-2 in FIG. 5 are configured by using two pairs of resonant type intensity modulators 30-1 and 30-2, and 30-3 and 30-4. Apart from the resonant type optical intensity modulators 30-1 to 30-4, the optical frequency conversion device 78 includes a modulation signal oscillator 11, optical phase control sections 12-2, 12-3, and 12-4, phase control sections 14-2, 14-3, and 14-4, and a desired bias point control section 16.

The resonant type optical intensity modulators 30-1 to 30-4 modulate an input lightwave based on a modulation signal generated by the modulation signal oscillator 11. Specifically, the resonant type optical intensity modulator 30-1 performs modulation by using the modulation signal from the modulation signal oscillator 11 as an individual modulation signal, while the resonant type optical intensity modulators 30-2 to 30-4 perform modulation based on individual modulation signals that are given phase differences by the phase control sections 14-2 to 14-4, respectively. More specifically, the phase control section 14-2 performs control so that an individual modulation signal for driving the resonant type optical intensity modulator 30-2 will have a phase difference of $-\pi/2$ with reference to an individual modulation signal for driving the resonant type optical intensity modulator 30-1, the phase control section 14-3 performs control so that an individual modulation signal for driving the resonant type optical intensity modulator 30-3 will have a phase difference of $\pi/4$, and the phase control section 14-4 performs control so that an individual modulation signal for driving the resonant type optical intensity modulator 30-4 will have a phase difference of $-\pi/4$. In addition, the phase control sections 14-1, 14-2, and 14-3 change their phase control operation points depending on modulation signal frequency information from the modulation signal oscillator 11.

The optical-phase control section 12-2 performs control so that an output lightwave of the resonant type optical intensity modulator 30-2 will have a phase difference of $\pi/2$ with reference to an output lightwave of the resonant type optical intensity modulator 30-1, the optical phase control section 12-3 performs control so that an output lightwave of the resonant type optical intensity modulator 30-3 will have a phase difference of $-\pi/4$, and the optical phase control section 12-4 performs control so that an output lightwave of the resonant type optical intensity modulator 30-4 will have a phase difference of $\pi/4$.

The desired bias point control section 16 controls the bias points of the resonant type optical intensity modulators 30-1 and 30-4 so that the optical intensity of output lightwaves of the four resonant type optical intensity modulators 30-1 to 30-4 will be the smallest when no modulation signal is input. Specifically, a desired bias point is the point A in FIG. 6, which shows the relation between bias voltage and the optical intensity of an output lightwave of an optical intensity modulator.

3.2) Operation

Basic operation of the optical frequency conversion device 78 according to the present example is similar to the first example and therefore will be described with reference to FIGS. 7 and 8.

In the optical frequency conversion device 78 having a configuration as described above, it is assumed that continuous-wave laser light of the carrier frequency $f_0$ having a frequency spectrum as shown in FIG. 7A is input. At this time, when an output lightwave of the resonant type optical intensity modulator 30-1 and an output lightwave of the resonant type optical intensity modulator 30-2 that has passed through the optical phase shift control section 12-2 are multiplexed, its frequency spectrum includes frequency components of $f_0+(4n+1)f$ (n is an integer) as shown in FIG. 7B.

On the other hand, when an output lightwave of the resonant type optical intensity modulator 30-3 that has passed through the optical phase shift control section 12-3 and an output lightwave of the resonant type optical intensity modulator 30-4 that has passed through the optical phase shift control section 12-4 are multiplexed, its frequency spectrum includes the frequency components of $f_0+(4n+1)f$ similarly to the frequency spectrum in FIG. 7B, but the phases of frequency components of $f_0+(8n-3)f$ are inverted by $\pi$.

Accordingly, when the output lightwave of the resonant type optical intensity modulator 30-1 and the output lightwaves of the resonant type optical intensity modulators 30-2 to 30-4 that have passed through the optical phase shift control sections 12-2 to 12-4 respectively are multiplexed, frequency components whose phases are mutually inverted by $\pi$ are cancelled out, so that a frequency spectrum including frequency components of $f_0+(8n+1)f$ as shown in FIG. 7C is obtained as an output lightwave of the optical frequency conversion device 78. That is, an output lightwave in which the carrier frequency $f_0$ is shifted to a frequency component of ($f_0+f$) can be obtained.

3.3) Effects

The effects of the present example are similar to those of the first example described above. The optical frequency conversion device 78 uses the four resonant type optical intensity modulators 30-1 to 30-4, whereby it is possible to shift the frequency $f_0$ of an input lightwave by an arbitrary shift amount, without using an optical band-pass filter. In addition, even if an input lightwave is a data signal, degradation of an output data signal due to its overlapping with another harmonic component does not occur, as shown in FIG. 7D.

4. Third Example

An optical frequency conversion device according to a third example of the present invention is configured by using four optical harmonic elimination sections. Here, to avoid complicating description, description will be given of a case as an example where an input lightwave with a carrier frequency $f_0$ is converted to an output lightwave with an optical frequency $f_0+f$ by using a modulation signal with a frequency f, and further third-, fifth-, seventh-, and ninth-order harmonics included in the output lightwave are eliminated at once.

4.1) Configuration

Figure 9:
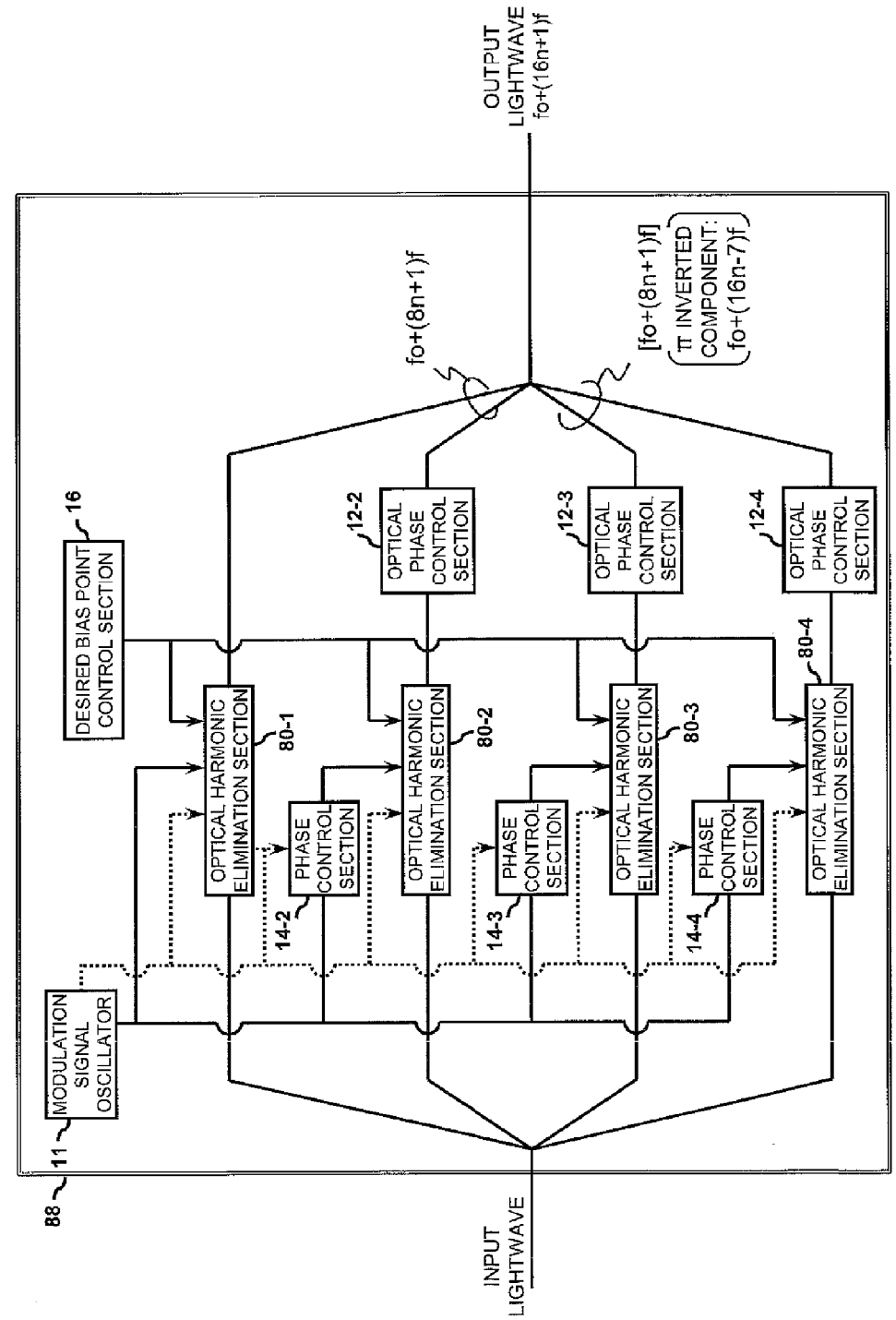
FIG. 9 is a block diagram showing a functional configuration of an optical frequency conversion device according to a third example of the present invention.
Figure 10:
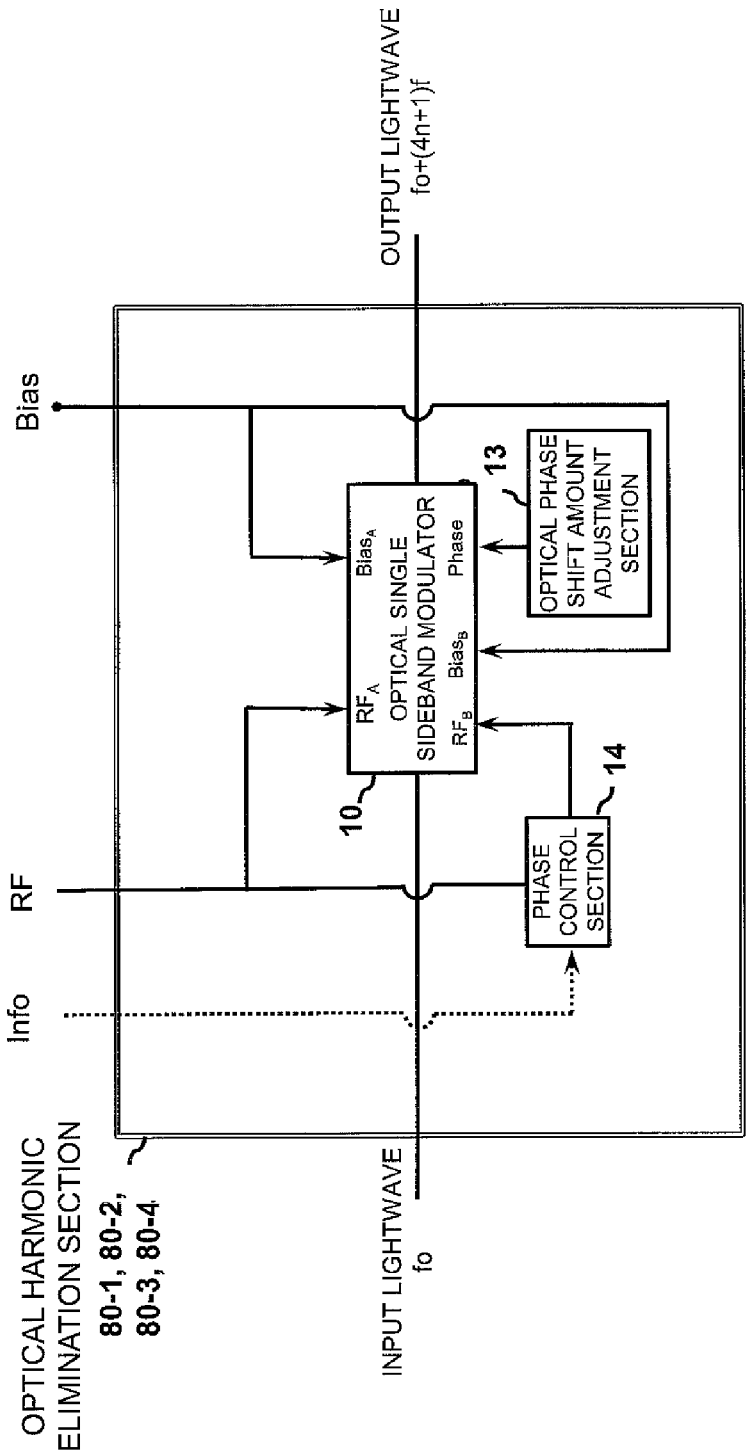
FIG. 10 is a block diagram showing a functional configuration of an optical harmonic elimination section shown in FIG. 9.

Referring to FIG. 9, an optical frequency conversion device 88 according to the present example includes four optical harmonic elimination sections 80-1 and 80-4, a modulation signal oscillator 11, three optical phase optical phase control sections 12-1 to 12-3, three phase control sections 14-1 to 14-3, and a desired bias point control section 16. Referring to FIG. 10, the optical harmonic elimination section 80 includes an optical single sideband modulator 10, a desired optical phase shift amount control section 13, and a phase control section 14.

The optical harmonic elimination sections 80-1 to 80-4 modulate an input lightwave by using a modulation signal generated by the modulation signal oscillator 11 as an individual modulation signal. Specifically, the optical harmonic elimination section 80-1 performs modulation by using the modulation signal from the modulation signal oscillator 11 as an individual modulation signal, while the optical harmonic elimination sections 80-2 to 80-4 perform modulation based on individual modulation signals that are given phase differences by the phase control sections 14-2 to 14-4, respectively. More specifically, the phase control section 14-2 performs control so that an individual modulation signal to be input to the optical harmonic elimination section 80-2 will have a phase difference of $-\pi/4$ with reference to an individual modulation signal to be input to the optical harmonic elimination section 80-1, the phase control section 14-3 performs control so that an individual modulation signal to be input to the optical harmonic elimination section 80-3 will have a phase difference of $\pi/8$, and the phase control section 14-4 performs control so that an individual modulation signal to be input to the optical harmonic elimination section 80-4 will have a phase difference of $-\pi/8$. In addition, the phase control sections 14-1 to 14-3 and the phase control sections 14 in the optical harmonic elimination sections 80-1 to 80-4 change their phase control operation points depending on modulation signal frequency information from the modulation signal oscillator 11.

The optical phase control section 12-2 performs control so that an output lightwave of the optical harmonic elimination section 80-2 will have a phase difference of $\pi/4$ with reference to an output lightwave of the optical harmonic elimination section 80-1, the optical phase control section 12-3 performs control so that an output lightwave of the optical harmonic elimination section 80-3 will have a phase difference of $-\pi/8$, and the optical phase control section 12-4 performs control so that an output lightwave of the optical harmonic elimination section 80-4 will have a phase difference of $\pi/8$.

The desired bias point control section 16 controls the bias points of the optical harmonic elimination sections 80-1 and 80-4 so that the optical intensity of output lightwaves of the four optical harmonic elimination sections 80-1 and 80-4 will be the smallest when no modulation signal is input. Specifically, a desired bias point is the point A in FIG. 6, which shows the relation between bias voltage and the optical intensity of an output lightwave of an optical intensity modulator.

4.2) Operation

In the optical frequency conversion device 88 according to the present example shown in FIG. 9, a first optical circuit including the two optical harmonic elimination sections 80-1 and 80-2, the optical phase control section 12-2, and the phase control section 14-2 is equivalent to the configuration of the optical frequency conversion device 78 according to the second example shown in FIG. 8. Accordingly, when an output lightwave of the optical harmonic elimination section 80-1 and an output lightwave of the optical phase control section 12-2 are multiplexed, an output lightwave including frequency components of $f_0+(8n+1)f$ (n is an integer) as shown in FIG. 7C is obtained. However, the frequency spectrum in FIG. 7C does not show harmonics of the order 6 and higher orders.

In the optical frequency conversion device 88 according to the present example shown in FIG. 9, a second optical circuit including the two optical harmonic elimination sections 80-3 and 80-4, the two optical phase control sections 12-3 and 12-4, and the two phase control sections 14-3 and 14-4 are provided in parallel with the first optical circuit. This second optical circuit is equivalent to the configuration of the optical frequency conversion device 78 according to second example shown in FIG. 8, except that the phases of output lightwaves of the two optical harmonic elimination sections 80-3 and 80-4 as well as the phases of modulation singles are different. Accordingly, as described above, the optical phase control sections 12-3 and 12-4 and the phase control sections 14-3 and 14-4 are set so as to give phase differences of $-\pi/8$, $\pi/8$, $\pi/8$, and $-\pi/8$, respectively, whereby the resultant includes the frequency component of $f_0+(8n+1)f$, but the phases of frequency components of $f_0+(16n-7)f$ are inverted by $\pi$.

Accordingly, an output lightwave of the first optical circuit and an output lightwave of the second optical circuit are multiplexed, whereby frequency components whose phases are mutually inverted by $\pi$ are cancelled out, so that a frequency spectrum including frequency components of $f_0+(16n+1)f$ is obtained as an output lightwave of the optical frequency conversion device 88. That is, it is possible to eliminate third-, fifth-, seventh-, and ninth-order frequency components ($f_0-3f$, $f_0+5f$, $f_0-7f$, and $f_0+9f$) included in the output lightwave at once.

4.3) Effects

As described above, the number of optical harmonic elimination sections 80 disposed in parallel is increased depending on desired precision; optical phase control sections that adjust the phases of input lightwaves to respective optical harmonic elimination sections and phase control sections that change the phase of a modulation signal for driving the optical harmonic elimination sections are provided; and bias applied to the optical harmonic elimination sections is controlled by the desired bias point control section, whereby among frequency components included in output lightwaves of the optical harmonic elimination sections, the phases of harmonic components to be eliminated are inverted by $\pi$, and it is thus possible to eliminate arbitrary harmonics by interference.

The effects of the present example are similar to those of the third example described above. The optical frequency conversion device 88 uses the four optical harmonic elimination sections 80-1 to 80-4, whereby it is possible to eliminate third-, fifth-, seventh-, and ninth-order harmonic components, and it is possible to shift the frequency $f_0$ of an input lightwave by an arbitrary shift amount, without using an optical band-pass filter. In addition, even if an input lightwave is a data signal, degradation of an output data signal due to its overlapping with another harmonic component does not occur, as shown in FIG. 7D.

5. Fourth Example

In the above-described first to third examples, the optical frequency conversion devices are configured by using a plurality of optical single sideband modulators 10. However, the present invention is not limited to these, but an equivalent function can be implemented by using optical interferometers and delay control means as in fourth to sixth examples, which will be described below. Hereinafter, to avoid complicating description, description will be given of a case as an example where an input lightwave with a carrier frequency $f_0$ is converted to an output lightwave with an optical frequency $f_0+f$ by using a modulation signal with a frequency f, and further third- and fifth-order harmonics included in the output lightwave, that is, a frequency component of an optical frequency $(f_0-3f)$ and a frequency component of an optical frequency $(f_0+5f)$ are eliminated at once.

5.1) Configuration

Figure 11:
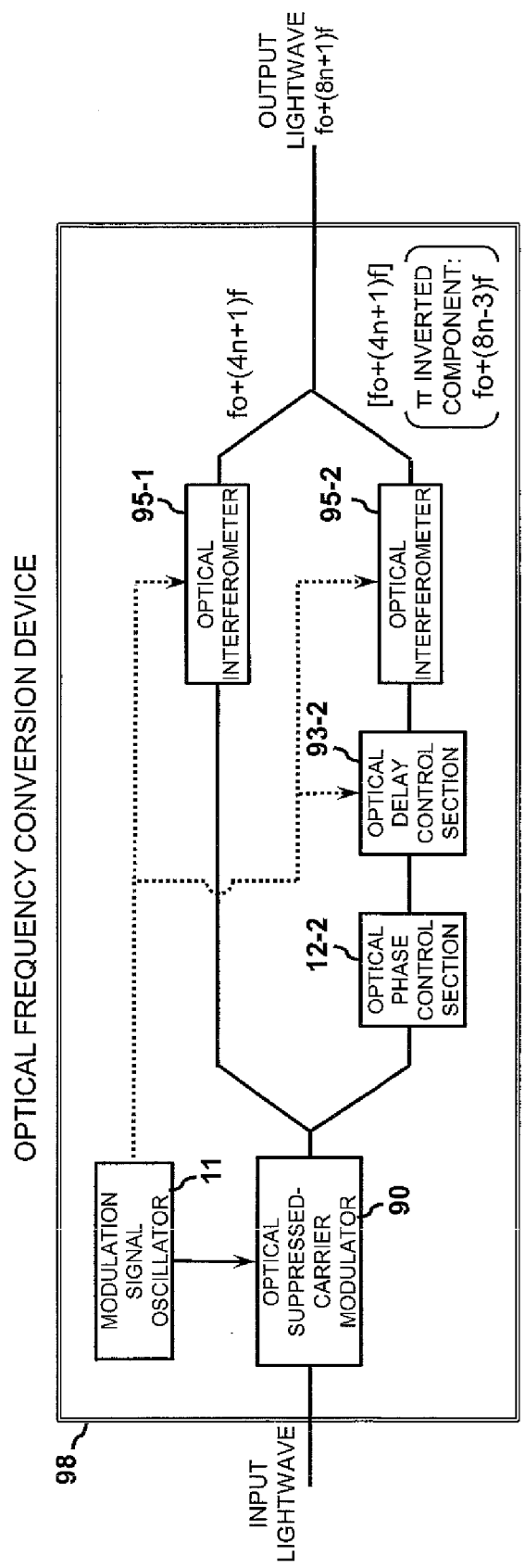
FIG. 11 is a block diagram showing a functional configuration of an optical frequency conversion device according to a fourth example of the present invention.

Referring to FIGS. 11 and 12, an optical frequency conversion device 98 according to a fourth example of the present invention includes an optical suppressed-carrier modulator 90, a modulation signal oscillator 11, an optical phase control section 12-2, an optical delay control section 93-2, and two optical interferometers 95-1 and 95-2. The optical suppressed-carrier modulator 90 modulates an input lightwave in accordance with a modulation signal from the modulation signal oscillator 11, and an output lightwave thereof is branched into two streams, one of which passes through the optical interferometer 95-1, and the other of which passes through the optical phase control section 12-2, the optical delay control section 93-2, and the optical interferometer 95-2. The two streams are then multiplexed and output as an output lightwave.

The optical suppressed-carrier modulator 90 includes a resonant type optical intensity modulator 30 and a desired bias point control section 16, as shown in FIG. 12A. The resonant type optical intensity modulator 30 modulates an input lightwave based on a modulation signal from the modulation signal oscillator 11. The desired bias point control section 16 controls the bias point of the resonant type optical intensity modulator 30 so that the optical intensity of an output lightwave of the resonant type optical intensity modulator 30 will be the smallest when no modulation signal is input. Specifically, a desired bias point is the point A in FIG. 6, which shows the relation between bias voltage and the optical intensity of an output lightwave of an optical intensity modulator.

In the optical interferometer 95 (95-1 and 95-2), an optical phase control section 12 and an optical delay control means 93 are provided to one of arms of a Mach-Zehnder waveguide, and a lightwave of this arm and a lightwave of the other arm are multiplexed and output. The optical phase control section 12 in the optical interferometer 95 performs control so that an output lightwave of the optical phase control section 12 will have a phase difference of $-\pi/2$ with reference to an input lightwave to the optical interferometer, and the optical delay control section 93 in the optical interferometer 95 performs control so that the input lightwave will be output with a delay of T/2. Moreover, the optical delay control section 93 changes a phase control operation point depending on the frequency of a modulation signal from the modulation signal oscillator 11. Note that the modulation signal generated by the modulation signal oscillator 11 is a sine wave of a single frequency, and the frequency thereof is assumed to be f, whose inverse is referred to as T $(=1/f)$ The optical phase control section 12-2 performs control so that input lightwaves to the two optical interferometers 95-1 and 95-2 will have a phase difference of $-\pi/4$. Moreover, the optical delay control section 93-2 performs control so that there will be a delay of T/4 between the input lightwaves to the two optical interferometers 95-1 and 95-2. Moreover, the optical delay control section 93-2 changes a phase control operation point depending on the frequency of a modulation signal from the modulation signal oscillator 11.

5.2) Operation

First, when continuous-wave laser light of the carrier frequency $f_0$ having a frequency spectrum as shown in FIG. 7A is input, the optical suppressed-carrier modulator 90 generates a lightwave having frequency components of $f_0+(2n-1)f$ (n is an integer) as shown in FIG. 2B.

In the optical interferometer 95-1, an input lightwave is branched into two streams as shown in FIG. 12B, and only the phases of frequency components of $f_0+(4n-1)f$ included in the input lightwave of one of the streams are inverted by $\pi$. Accordingly, when the input lightwaves are multiplexed, frequency components whose phases differ from each other by $\pi$ are cancelled out, so that an output lightwave of the optical interferometer 95-1 includes frequency components of $f_0+(4n+1)f$ as shown in FIG. 7B.

On the other hand, an output lightwave of the optical interferometer 95-2 similarly has the spectrum shown in FIG. 7B, but the phase of each frequency component is different. That is, the phases of frequency components of $f_0+(8n-3)f$ included in the output lightwave of the optical interferometer 95-2 are inverted by $\pi$. Accordingly, the output lightwaves of the optical interferometers 95-1 and 95-2 are multiplexed, whereby frequency components whose phases differ from each other by $\pi$ are cancelled out, so that an output lightwave including frequency components of $f_0+(8n+1)$ as shown in FIG. 7C can be obtained.

5.3) Effects

As described above, the optical frequency conversion device 98 according to the present example, as in the first and second example described above, can shift an input lightwave by an arbitrary frequency shift amount, and further it is possible to eliminate frequency components of $f_0-3f$ and $f_0+5f$ in an output lightwave of the optical frequency conversion device 98. In addition, it is possible to dynamically shift the frequency of an input lightwave by dynamically change the operation frequency f of the modulation signal oscillator 11.

Note that when an input lightwave with the carrier frequency $f_0$ is converted into an inverse direction, that is, converted to an output lightwave with a frequency $f_0-f$, and further a frequency component of an optical frequency $(f_0+3f)$ and a frequency component of an optical frequency $(f_0-5f)$ included in the output lightwave are eliminated at once, then control may be performed in such a manner that, for example, a phase difference of $\pi/2$ is given by the optical phase control sections 12 provided in the two optical interferometers 95-1 and 95-2, and a phase difference of $\pi/4$ is given by the optical phase control section 12-2 with reference to an output lightwave of the optical suppressed-carrier modulator 90.

6. Fifth Example

According to a fifth example of the present invention, which will described next, the two optical interferometers 95-1 and 95-2 in the above-described optical frequency conversion device 98 can be configured by using three optical phase control sections and three optical delay control sections. Hereinafter, to avoid complicating description, description will be given of a case as an example where an input lightwave with a carrier frequency $f_0$ is converted to an output lightwave with an optical frequency $f_0+f$ by using a modulation signal with a frequency f, and further third- and fifth-order harmonics included in the output lightwave, that is, a frequency component of an optical frequency ($f_0$–3f) and a frequency component of an optical frequency ($f_0$+5f) are eliminated at once.

6.1) Configuration

Figure 13:
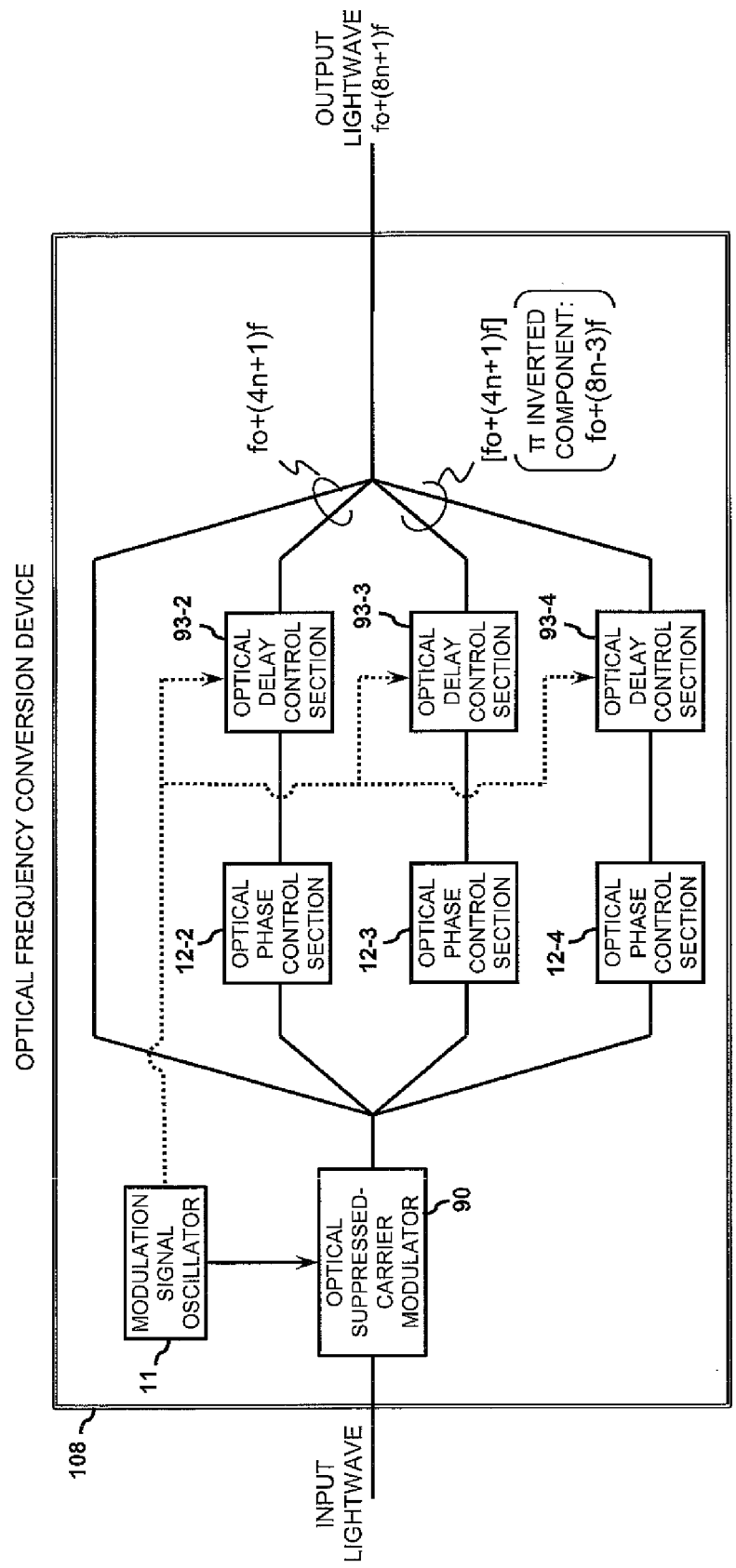
FIG. 13 is a block diagram showing a functional configuration of an optical frequency conversion device according to a fifth example of the present invention.

Referring to FIG. 13, an optical frequency conversion device 108 according to the present example includes an optical suppressed-carrier modulator 90, a modulation signal oscillator 11, three optical phase control sections 12-1 to 12-3, and three optical delay control sections 93-2 to 93-4. The optical suppressed-carrier modulator 90 modulates an input lightwave in accordance with a modulation signal from the modulation signal oscillator 11, and an output lightwave thereof is branched into four streams. A first branched light stream which is as it is, a second branched light stream which has passed through the optical phase control section 12-2 and the optical delay control section 93-2, a third branched light stream which has passed through the optical phase control section 12-3 and the optical delay control section 93-3, and a fourth branched light stream which has passed through the optical phase control section 12-4 and the optical delay control section 93-4, are multiplexed and output as an output lightwave.

The optical phase control sections 12-2, 12-3, and 12-4 perform control so as to give phase differences of $-\pi/2$, $-\pi/4$, and $-3\pi/4$, respectively, with reference to an output lightwave of the optical suppressed-carrier modulator 90.

The optical delay control sections 93-2, 93-3, and 93-4 perform control so as to give delays of T/2, T/4, and 3T/4, respectively, with reference to the output lightwave of the optical suppressed-carrier modulator 90. In addition, the three optical delay control sections 93-1, 93-2, and 93-3 change phase control operation points depending on the frequency of a modulation signal from the modulation signal oscillator 11.

6.2) Operation

First, when continuous-wave laser light of the carrier frequency $f_0$ having a frequency spectrum as shown in FIG. 7A is input, the optical suppressed-carrier modulator 90 generates a lightwave having frequency components of $f_0+(2n-1)f$ (n is an integer) as shown in FIG. 2B.

An output lightwave of the optical delay control section 93-2 has a spectrum as shown in FIG. 2B, but the phases of frequency components of $f_0+(4n-1)f$ (n is an integer) are inverted by $\pi$. Accordingly, when the output lightwave of the optical suppressed-carrier modulator 90 and the output lightwave of the optical delay control section 93-2 are multiplexed, frequency components whose phases differ from each other by $\pi$ are cancelled out, and therefore frequency components of $f_0+(4n+1)f$ as shown in FIG. 7B are included.

Similarly, a lightwave obtained after output lightwaves of the two optical delay control sections 93-3 and 93-4 are multiplexed includes the frequency components of $f_0+(4n+1)f$ shown in FIG. 7B, but the phases of frequency components of $f_0+(8n-3)f$ are inverted by $\pi$.

Accordingly, when the lightwave obtained after the output lightwave of the optical suppressed-carrier modulator 90 and the output lightwave of the optical delay control section 93-2 are multiplexed is multiplexed with the lightwave obtained after the output lightwaves of the optical lightwave delay control sections 93-3 and 93-4 are multiplexed, frequency components whose phases differ from each other by $\pi$ are cancelled out, and therefore an output lightwave of the optical frequency conversion device 108 includes frequency components of $f_0+(8n+1)f$ as shown in FIG. 7D.

6.3) Effects

As described above, the optical frequency conversion device 108 according to the present example, as in the above-described fourth example, can shift an input lightwave by an arbitrary frequency shift amount, and further it is possible to eliminate frequency components of $f_0$–3f and $f_0$+5f in an output lightwave of the optical frequency conversion device 108. In addition, it is possible to dynamically shift the frequency of an input lightwave by dynamically change the operation frequency f of the modulation signal oscillator 11.

7. Sixth Example

An optical frequency conversion device according to a sixth example of the present invention achieves optical frequency conversion with higher precision by using three or more optical interferometers. Here, to avoid complicating description, description will be given of a case as an example where an input lightwave with a carrier frequency $f_0$ is converted to an output lightwave with an optical frequency $f_0+f$ by using a modulation signal with a frequency f, and further third-, fifth-, seventh-, and ninth-order harmonic components included in the output lightwave are eliminated at once.

7.1) Configuration

Figure 14:
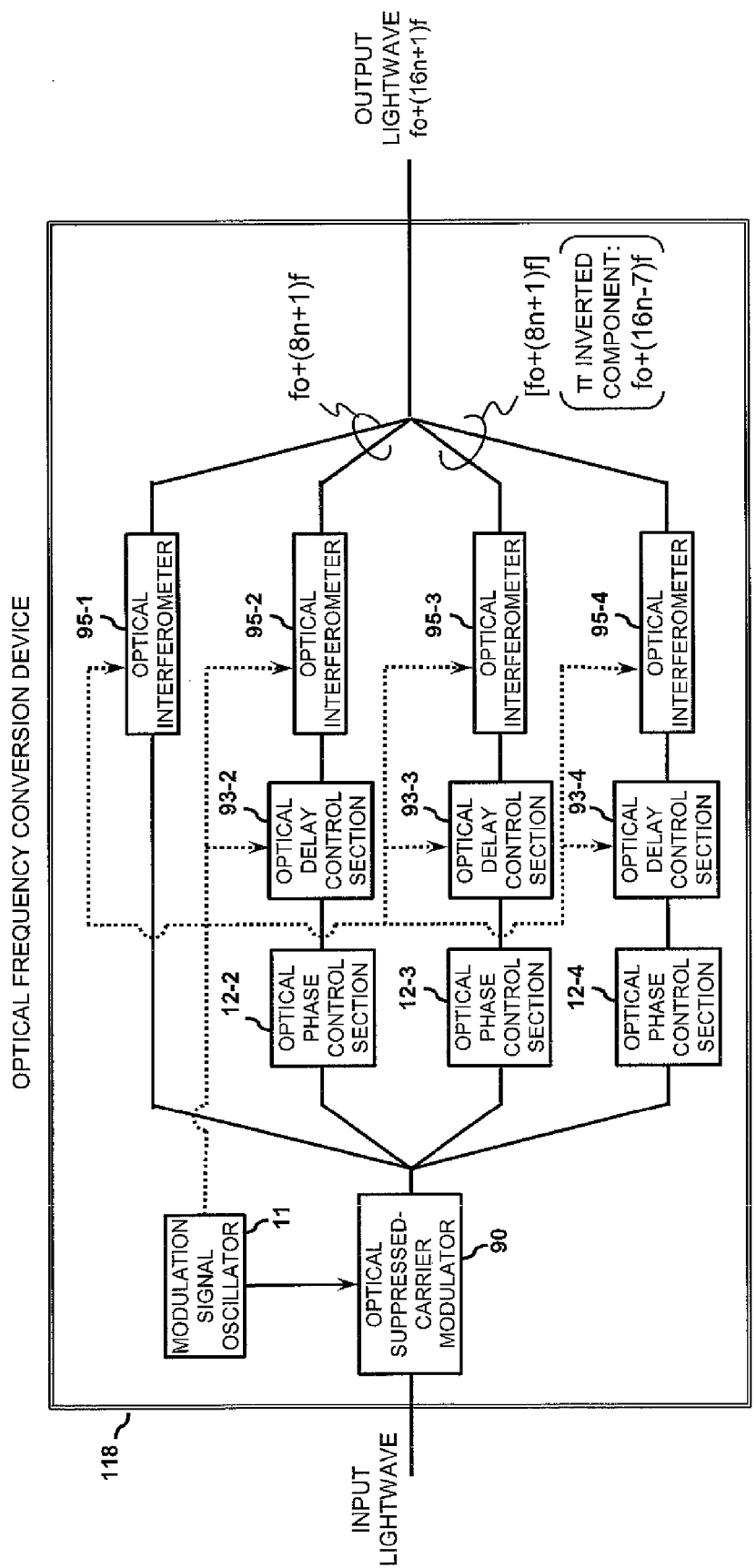
FIG. 14 is a block diagram showing a functional configuration of an optical frequency conversion device according to a sixth example of the present invention.

Referring to FIG. 14, an optical frequency conversion device 118 according to the present example includes an optical suppressed-carrier modulator 90, a modulation signal oscillator 11, four optical interferometers 95-1 to 95-4, three optical phase control sections 12-2 to 12-4, and three optical delay control sections 93-2 to 93-4.

The optical suppressed-carrier modulator 90 modulates an input lightwave in accordance with a modulation signal from the modulation signal oscillator 11, and an output lightwave thereof is branched into four streams. A first branched light stream which has passed through the optical interferometer 95-1, a second branched light stream which has passed through the optical phase control section 12-2, the optical delay control section 93-2, and the optical interferometer 95-2, a third branched light stream which has passed through the optical phase control section 12-3, the optical delay control section 93-3, and the optical interferometer 95-3, and a fourth branched light stream which has passed through the optical phase control section 12-4, the optical delay control section 93-4, and the optical interferometer 95-4, are multiplexed and output as an output lightwave.

The optical phase control sections 12-2, 12-3, and 12-4 perform control so as to give phase differences of $-\pi/4$, $-\pi/8$, and $-3\pi/8$, respectively, with reference to an output lightwave of the optical suppressed-carrier modulator 90.

The optical delay control section 93-2, the optical delay control means 93-3, and the optical delay control section 93-4 perform control so as to give delays of T/4, T/8, and 3T/8, respectively, with reference to an output lightwave of the optical suppressed-carrier modulator 90.

7.2) Operation

A first optical circuit including the optical interferometer 95-1, the optical phase control section 12-2, the optical delay control means 93-2, and the optical interferometer 95-2 is equivalent to the optical frequency conversion device 108 according to the fifth example described above, and therefore an output lightwave thereof includes frequency components of $f_0+(8n+1)f$ (n is an integer) as shown in FIG. 7D.

On the other hand, an output lightwave of a second optical circuit including the phase control section 12-3, the optical delay control section 93-3, the optical interferometer 95-3, the optical phase control section 12-4, the optical delay control section 93-4, and the optical interferometer 95-4 includes the frequency components of $f_0+(8n+1)f$ as shown in FIG. 7D, of which the phases of frequency components of $f_0+(16n-7)f$ are inverted by $\pi$.

Accordingly, when the output lightwave of the first optical circuit and the output lightwave of the second optical circuit are multiplexed, frequency components whose phases differ from each other by $\pi$ are cancelled out, so that an output lightwave of the optical frequency conversion device 118 includes frequency components of $f_0+(16n+1)f$.

7.3) Effects

As described above, the optical frequency conversion device 118 according to the present example has effects similar to those of the fourth and fifth examples described above. In addition, the number of optical interferometers disposed in parallel is increased depending on desired precision; optical phase control sections that adjust the phases of input lightwaves to the respective optical interferometers and optical delay control sections that control delay amounts for the input lightwaves to the respective interferometers are provided; and among frequency components included in output lightwaves of the optical harmonic elimination sections, the phases of harmonic components to be eliminated are inverted by $\pi$, whereby it is possible to eliminate arbitrary harmonics by interference.

That is, third-, fifth-, seventh-, and ninth-order harmonic components can be eliminated by using the four optical interferometers 95-1 to 95-4, and it is possible to shift the frequency $f_0$ of an input lightwave by an arbitrary shift amount, without using an optical band-pass filter. In addition, even if an input lightwave is a data signal, degradation of an output data signal due to its overlapping with another harmonic component does not occur, as shown in FIG. 7D.

8. Additional Statements

Part or all of the above-described exemplary embodiments can also be stated as in, but is not limited to, the following additional statements.

(Additional Statement 1)

An optical frequency conversion device which converts a frequency of an input lightwave in accordance with a modulation signal by using an optical single sideband modulation scheme and thereby generates an output lightwave, characterized by comprising:

a plurality of phase control means for respectively generating from the modulation signal a plurality of individual modulation signals with different phases;

a plurality of optical single sideband modulation means for respectively modulating the input lightwave in accordance with the plurality of individual modulation signals;

a plurality of optical phase control means for respectively giving optical phase differences to a plurality of lightwaves that are respectively output from the plurality of optical single sideband modulation means; and multiplexing means for multiplexing a plurality of lightwaves that are output from the plurality of optical phase control means to generate the output lightwave, wherein phase differences among the plurality of individual modulation signals and the optical phase differences are set so that predetermined harmonic components other than a target frequency in the output lightwave will be eliminated.

(Additional Statement 2)

The optical frequency conversion device according to additional statement 1, characterized in that the plurality of lightwaves respectively output from the plurality of optical phase control means have same frequency spectra, and the phase differences among the plurality of individual modulation signals and the optical phase differences are set so that a phase difference of $\pi$ will be given to the predetermined harmonic component.

(Additional Statement 3)

The optical frequency conversion device according to additional statement 1 or 2, characterized in that when n is a number of the plurality of phase control means, $f_0$ is the frequency of the input lightwave, f is a frequency of the modulation signal, and $f_0+(2m+1)f$ is a frequency of the predetermined harmonic component, then the phase differences among the plurality of individual modulation signals and the optical phase differences are $\pi/2^{k+1}$ and $-\pi/2^{k+1}$ (k=1, ..., n−1), respectively, where n is the smallest integer that is not smaller than $\log_2(m)$.

(Additional Statement 4)

The optical frequency conversion device according to any one of additional statements 1 to 3, characterized in that the input lightwave is an optical signal with a frequency $f_0$, the modulation signal is an electric signal with a variable frequency f, and the output lightwave is an optical signal with the target frequency of $f_0+f$ or $f_0-f$.

(Additional Statement 5)

The optical frequency conversion device according to additional statement 4, characterized in that the plurality of phase control means change phase control operation points depending the frequency f of the modulation signal.

(Additional Statement 6)

The optical frequency conversion device according to any one of additional statements 1 to 5, characterized in that for each of the plurality of optical single sideband modulation means, bias is set so that optical intensity of an output lightwave of the optical single sideband modulation means will be the smallest in a state where no individual modulation signal is input to the optical single sideband modulation means.

(Additional Statement 7)

An optical frequency conversion method in which a frequency of an input lightwave is converted in accordance with a modulation signal by using a sideband modulation scheme and an output lightwave is thereby generated, characterized by:

a plurality of phase control means respectively generating from the modulation signal a plurality of individual modulation signals with different phases;

a plurality of optical single sideband modulation means respectively modulating the input lightwave in accordance with the plurality of individual modulation signals;

a plurality of optical phase control means respectively giving optical phase differences to a plurality of optical lightwaves that are respectively output from the plurality of optical single sideband modulation means; and multiplexing means multiplexing a plurality of lightwaves that are output from the plurality of optical phase control means to generate the output lightwave, wherein phase differences among the plurality of individual modulation signals and the optical phase differences are set so that predetermined harmonic components other than a target frequency in the output lightwave will be eliminated.

(Additional Statement 8)

The optical frequency conversion method according to additional statement 7, characterized in that the plurality of lightwaves respectively output from the plurality of optical phase control means have same frequency spectra, and the phase differences among the plurality of individual modulation signals and the optical phase differences are set so that a phase difference of $\pi$ will be given to the predetermined harmonic component.

(Additional Statement 9)

The optical frequency conversion device according to additional statement 7 or 8, characterized in that when n is a number of the plurality of phase control means, $f_0$ is the frequency of the input lightwave, f is a frequency of the modulation signal, and $f_0+(2m+1)f$ is a frequency of the predetermined harmonic component, then the phase differences among the plurality of individual modulation signals and the optical phase differences are $\pi/2^{k+1}$ and $-\pi/2^{k+1}$ (k=1, ..., n−1), respectively, where n is the smallest integer that is not smaller than $\log_2(m)$.

(Additional Statement 10)

The optical frequency conversion method according to any one of claims 7 to 9, characterized in that the input lightwave is an optical signal with a frequency $f_0$, the modulation signal is an electric signal with a variable frequency f, and the output lightwave is an optical signal with the target frequency of $f_0+f$ or $f_0-f$.

(Additional Statement 11)

The optical frequency conversion method according to additional statement 10, characterized in that the plurality of phase control means change phase control operation points depending the frequency f of the modulation signal.

(Additional Statement 12)

The optical frequency conversion method according to any one of additional statements 7 to 11, characterized in that for each of the plurality of optical single sideband modulation means, bias is set so that optical intensity of an output lightwave of the optical single sideband modulation means will be the smallest in a state where no individual modulation signal is input to the optical single sideband modulation means.

(Additional Statement 13)

An optical transmitter that transmits an input lightwave after converting its frequency in accordance with a modulation signal by using a sideband modulation scheme, characterized by comprising:

a plurality of phase control means for respectively generating from the modulation signal a plurality of individual modulation signals with different phases;

a plurality of optical single sideband modulation means for respectively modulating the input optical signal in accordance with the plurality of individual modulation signals;

a plurality of optical phase control means for respectively giving optical phase differences to a plurality of optical signals that are respectively output from the plurality of optical single sideband modulation means; and multiplexing means for multiplexing a plurality of optical signals that are output from the plurality of optical phase control means to generate a transmission optical signal, wherein phase differences among the plurality of individual modulation signals and the optical phase differences are set so that predetermined harmonic components other than a target frequency in the transmission optical signal will be eliminated.

(Additional Statement 14)

The optical transmitter according to additional statement 13, characterized in that the plurality of optical signals respectively output from the plurality of optical phase control means have same frequency spectra, and the phase differences among the plurality of individual modulation signals and the optical phase differences are set so that a phase difference of π will be given to the predetermined harmonic component.

(Additional Statement 15)

The optical frequency conversion device according to additional statement 13 or 14, characterized in that when n is a number of the plurality of phase control means, $f_0$ is the frequency of the input lightwave, f is a frequency of the modulation signal, and $f_0+(2m+1)f$ is a frequency of the predetermined harmonic component, then the phase differences among the plurality of individual modulation signals and the optical phase differences are $\pi/2^{k+1}$ and $-\pi/2^{k+1}$ (k=1, ..., n−1), respectively, where n is the smallest integer that is not smaller than $\log_2(m)$.

(Additional Statement 16)

The optical transmitter according to any one of additional statements 13 to 15, characterized in that the input optical signal is an optical signal with a frequency $f_0$, the modulation signal is an electric signal with a variable frequency f, and the transmission optical signal is an optical signal with the target frequency of $f_0+f$ or $f_0-f$.

(Additional Statement 17)

The optical transmitter according to additional statement 16, characterized in that the plurality of phase control means change phase control operation points depending the frequency f of the modulation signal.

(Additional Statement 18)

The optical transmitter according to any one of additional statements 13 to 17, characterized in that for each of the plurality of optical single sideband modulation means, bias is set so that optical intensity of an output lightwave of the optical single sideband modulation means will be the smallest in a state where no individual modulation signal is input to the optical single sideband modulation means.

(Additional Statement 19)

An optical frequency conversion device which converts a frequency of an input lightwave in accordance with a modulation signal by using a sideband modulation scheme and thereby generates an output lightwave, characterized by comprising:

optical suppressed-carrier modulation means for modulating the input lightwave in accordance with the modulation signal; and first optical interference means for generating the output lightwave, wherein the first optical interference means has a plurality of waveguides that receive as an input a lightwave output from the optical suppressed-carrier modulation means and propagate a plurality of light streams branched from the lightwave, and multiplexes the plurality of branched light streams that have been propagated through the plurality of waveguides, thereby generating the output lightwave, wherein along the plurality of waveguides of the first optical interference means, first optical phase control means, first optical delay control means, and second optical interference means are provided, wherein the second optical interference means has two waveguides, along one of which second optical phase control means and second optical delay control means are provided, and wherein optical phase differences and optical delay amounts respectively made by the first optical phase control means and the first optical delay control means provided along the plurality of individual waveguides are set so that predetermined harmonic components other than a target frequency in the output lightwave will be eliminated.

(Additional Statement 20)

The optical frequency conversion device according to additional statement 19, characterized in that the lightwaves respectively output from the plurality of waveguides have same frequency spectra, and the optical phase differences and the optical delay amounts made by the first optical phase control means and the first optical delay control means are respectively set so that a phase difference of π will be given to the predetermined harmonic component.

(Additional Statement 21)

The optical frequency conversion device according to additional statement 19 or 20, characterized in that the input lightwave is an optical signal with a frequency $f_0$, the modulation signal is an electric signal with a variable frequency f, and the output lightwave is an optical signal with the target frequency of $f_0+f$ or $f_0-f$.

(Additional Statement 22)

The optical frequency conversion device according to additional statement 21, characterized in that the first optical delay control means and the second optical delay control means change phase control operation points depending the frequency f of the modulation signal.

(Additional Statement 23)

An optical frequency conversion method in which a frequency of an input lightwave is converted in accordance with a modulation signal by using a sideband modulation scheme and an output lightwave is thereby generated, characterized by comprising:

optical suppressed-carrier modulation means modulating the input lightwave in accordance with the modulation signal; and first optical interference means receiving as an input a lightwave output from the optical suppressed-carrier modulation means, propagating a plurality of light streams branched from the lightwave through a plurality of waveguides, respectively, and multiplexing the plurality of branched light streams that have been propagated through the plurality of waveguides to generate the output lightwave, wherein along the plurality of waveguides of the first optical interference means, first optical phase control means, first optical delay control means, and second optical interference means are provided, wherein the second optical interference means has two waveguides, along one of which second optical phase control means and second optical delay control means are provided, and wherein optical phase differences and optical delay amounts made by the first optical phase control means and the first optical delay control means provided along the plurality of individual waveguides are respectively set so that predetermined harmonic components other than a target frequency in the output lightwave will be eliminated.

(Additional Statement 24)

The optical frequency conversion method according to additional statement 23, characterized in that the lightwaves respectively output from the plurality of waveguides have same frequency spectra, and the optical phase differences and the optical delay amounts made by the first optical phase control means and the first optical delay control means are respectively set so that a phase difference of $\pi$ will be given to the predetermined harmonic component.

(Additional Statement 25)

The optical frequency conversion method according to additional statement 23 or 24, characterized in that the input lightwave is an optical signal with a frequency $f_0$, the modulation signal is an electric signal with a variable frequency f, and the output lightwave is an optical signal with the target frequency of $f_0+f$ or $f_0-f$.

(Additional Statement 26)

The optical frequency conversion method according to additional statement 25, characterized in that the first optical delay control means and the second optical delay control means change phase control operation points depending the frequency f of the modulation signal.

INDUSTRIAL APPLICABILITY

The present invention is applicable to an optical frequency converter used for an optical transmitter and the like.

REFERENCE SIGNS LIST

10 Optical single sideband modulator
11 Modulation signal oscillator
12, 201 Optical phase control section
13 Optical phase shift amount control section
14, 101 Phase control section
16 Desired bias point control section
30 Resonant type optical intensity modulator
32 Optical phase shifter
68, 78, 88, 98, 108, 118 Optical frequency conversion device
80 Harmonic elimination section
90 Optical suppressed-carrier modulator
93 Optical delay control section
95 Optical interferometer

What is claimed is:

1. An optical frequency conversion device which converts a frequency of an input lightwave in accordance with a modulation signal by using a sideband modulation scheme and thereby generates an output lightwave, comprising:

a plurality of phase controllers for respectively generating from the modulation signal a plurality of individual modulation signals with different phases;

a plurality of optical single sideband modulators for respectively modulating the input lightwave in accordance with the plurality of individual modulation signals;

a plurality of optical phase controllers for respectively giving optical phase differences to a plurality of lightwaves that are respectively output from the plurality of optical single sideband modulators; and a multiplexer for multiplexing a plurality of lightwaves that are output from the plurality of optical phase controllers to generate the output lightwave, wherein each of the plurality of phase controllers and each of the plurality of optical phase controllers is configured such that phase differences among the plurality of individual modulation signals and the optical phase differences are set so that third or higher predetermined harmonic components other than a target frequency in the output lightwave will be eliminated.

2. The optical frequency conversion device according to claim 1, wherein the plurality of lightwaves respectively output from the plurality of optical phase controllers have same frequency spectra, and the phase differences among the plurality of individual modulation signals and the optical phase differences are set so that a phase difference of $\pi$ will be given to the predetermined harmonic components.

3. The optical frequency conversion device according to claim 1, wherein when n is a number of the plurality of phase control means, f0 is the frequency of the input lightwave, f is a frequency of the modulation signal, and $f0+(2m+1)f$ is a frequency of the predetermined harmonic component, then the phase differences among the plurality of individual modulation signals and the optical phase differences are $\pi/2k+1$ and $-\pi/2k+1$ (k=1, . . . , n−1), respectively, where n is the smallest integer that is not smaller than log 2(m).

4. The optical frequency conversion device according to claim 1, wherein the input lightwave is an optical signal with a frequency f0, the modulation signal is an electric signal with a variable frequency f, and the output lightwave is an optical signal with the target frequency of $f0+f$ or $f0-f$.

5. The optical frequency conversion device according to claim 4, wherein the plurality of phase controllers change phase control operation points based on the frequency f of the modulation signal.

6. The optical frequency conversion device according to claim 1, wherein for each of the plurality of optical single sideband modulators, a bias is set so that an optical intensity of an output lightwave of the respective optical single sideband modulator will be the smallest in a state where no individual modulation signal is input to the respective optical single sideband modulator.

7. An optical transmitter that transmits an input optical signal after converting its frequency in accordance with a modulation signal, comprising the optical frequency conversion device according to claim 1.

* * * * *